(12) United States Patent
Love

(10) Patent No.: US 9,174,768 B2
(45) Date of Patent: Nov. 3, 2015

(54) APPARATUS FOR FABRICATION OF A STRUCTURAL MEMBER AND RELATED FABRICATION METHODS

(71) Applicant: INTRALOQUE LICENSING GROUP, INC., Minneapolis, MN (US)

(72) Inventor: David Michael Love, Salt Lake City, UT (US)

(73) Assignee: INTRALOQUE LICENSING GROUP, INC, Minneapolis, MN (US)

( * ) Notice: Subject to any disclaimer, the term of this patent is extended or adjusted under 35 U.S.C. 154(b) by 0 days.

(21) Appl. No.: 14/128,580

(22) PCT Filed: Aug. 14, 2013

(86) PCT No.: PCT/US2013/055013
§ 371 (c)(1),
(2) Date: Dec. 20, 2013

(87) PCT Pub. No.: WO2014/028666
PCT Pub. Date: Feb. 20, 2014

(65) Prior Publication Data
US 2015/0059182 A1    Mar. 5, 2015

Related U.S. Application Data

(60) Provisional application No. 61/684,109, filed on Aug. 16, 2012.

(51) Int. Cl.
*B31D 3/02* (2006.01)
*B65D 19/38* (2006.01)
(Continued)

(52) U.S. Cl.
CPC .............. *B65D 19/385* (2013.01); *B31D 3/002* (2013.01); *B31D 3/005* (2013.01); *B31D 3/0284* (2013.01); *B31D 5/0069* (2013.01);
(Continued)

(58) Field of Classification Search
None
See application file for complete search history.

(56) References Cited

U.S. PATENT DOCUMENTS 1,650,049 A    11/1927    Bridgman
1,776,255 A     9/1930    Albert
(Continued)

FOREIGN PATENT DOCUMENTS

WO    2008008095    1/2008

OTHER PUBLICATIONS

International Search Report from International Patent Application No. PCT/US2013/055013 mailed Nov. 14, 2013.

*Primary Examiner* — Barbara J Musser
(74) *Attorney, Agent, or Firm* — Cardle Patent Law Chtd

(57) ABSTRACT

A fabrication machine is disclosed herein. In various aspects, the fabrication machine includes a brake adapted to mechanically cooperate with a wrapper to impart a longitudinal tension to the wrapper by controlling the force required to advance the wrapper, the wrapper comprised of a cellulose-based material. The brake is adjustable to allow selection of longitudinal tension in the wrapper, in various aspects. Various aspects may include a wrapper roll in mechanical cooperation with the brake, the wrapper being drawn from the wrapper roll as the wrapper is advanced. The fabrication machine secures the wrapper at the selected tension about the core to form a structural member, in various aspects. Methods of use of the fabrication machine are disclosed herein. This Abstract is presented to meet requirements of 37 C.F.R. §1.72 (b) only. This Abstract is not intended to identify key elements of the apparatus and methods disclosed herein or to delineate the scope thereof.

24 Claims, 12 Drawing Sheets

(51) Int. Cl.
*B31F 1/00* (2006.01)
*B31D 3/00* (2006.01)
*B31D 5/00* (2006.01)

(52) U.S. Cl.
CPC ............ *B31F 1/0029* (2013.01); *B31F 1/0061* (2013.01); *Y10T 156/101* (2015.01); *Y10T 156/103* (2015.01)

(56) References Cited

U.S. PATENT DOCUMENTS

| | | |
|---|---|---|
| 3,655,478 A | 4/1972 | Geschwender |
| 4,231,210 A | 11/1980 | Nagode |
| 5,372,570 A | 12/1994 | Schmidtke et al. |
| 5,584,951 A | 12/1996 | MacFarland |
| 5,797,832 A | 8/1998 | Ong et al. |

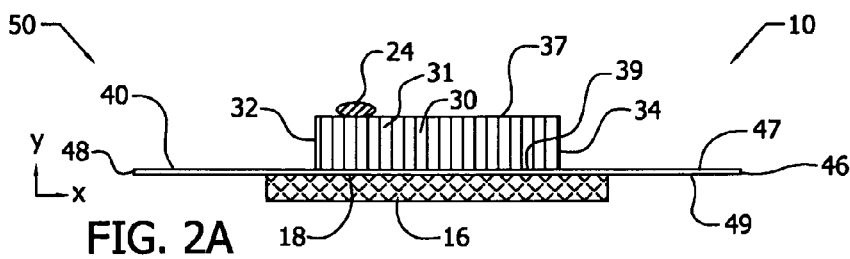
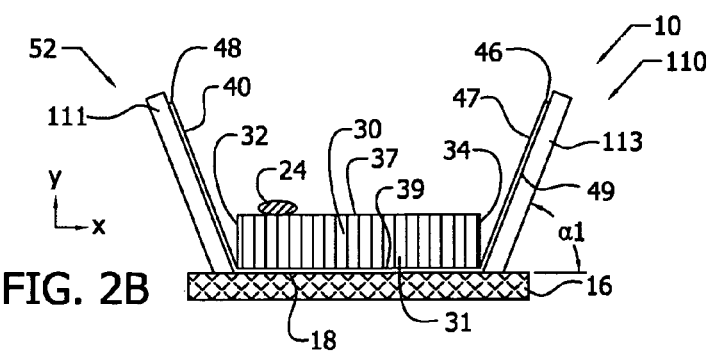
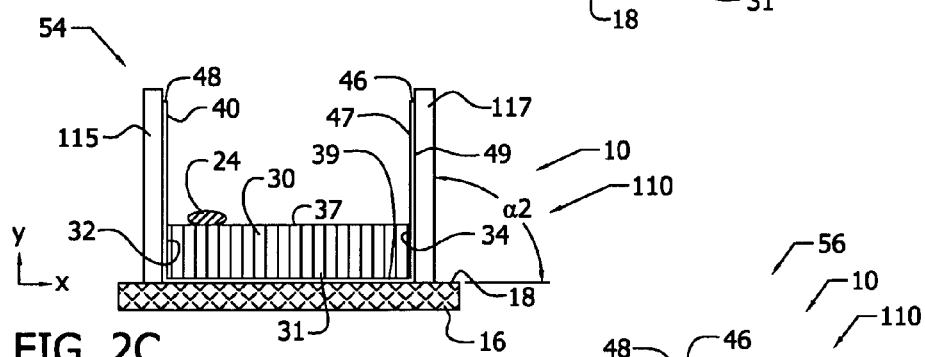
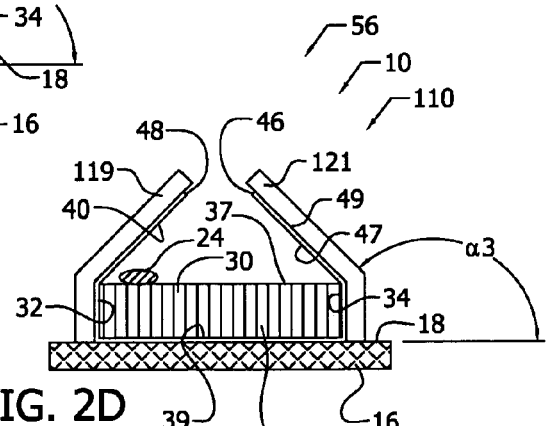
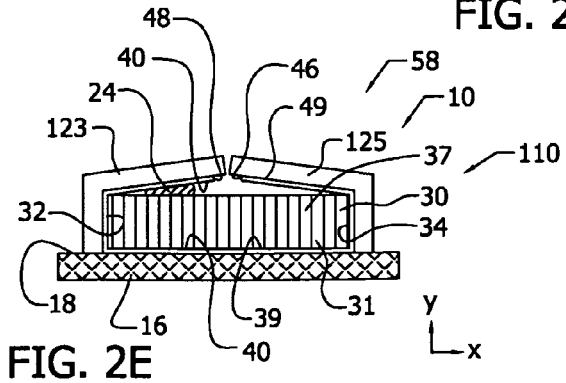

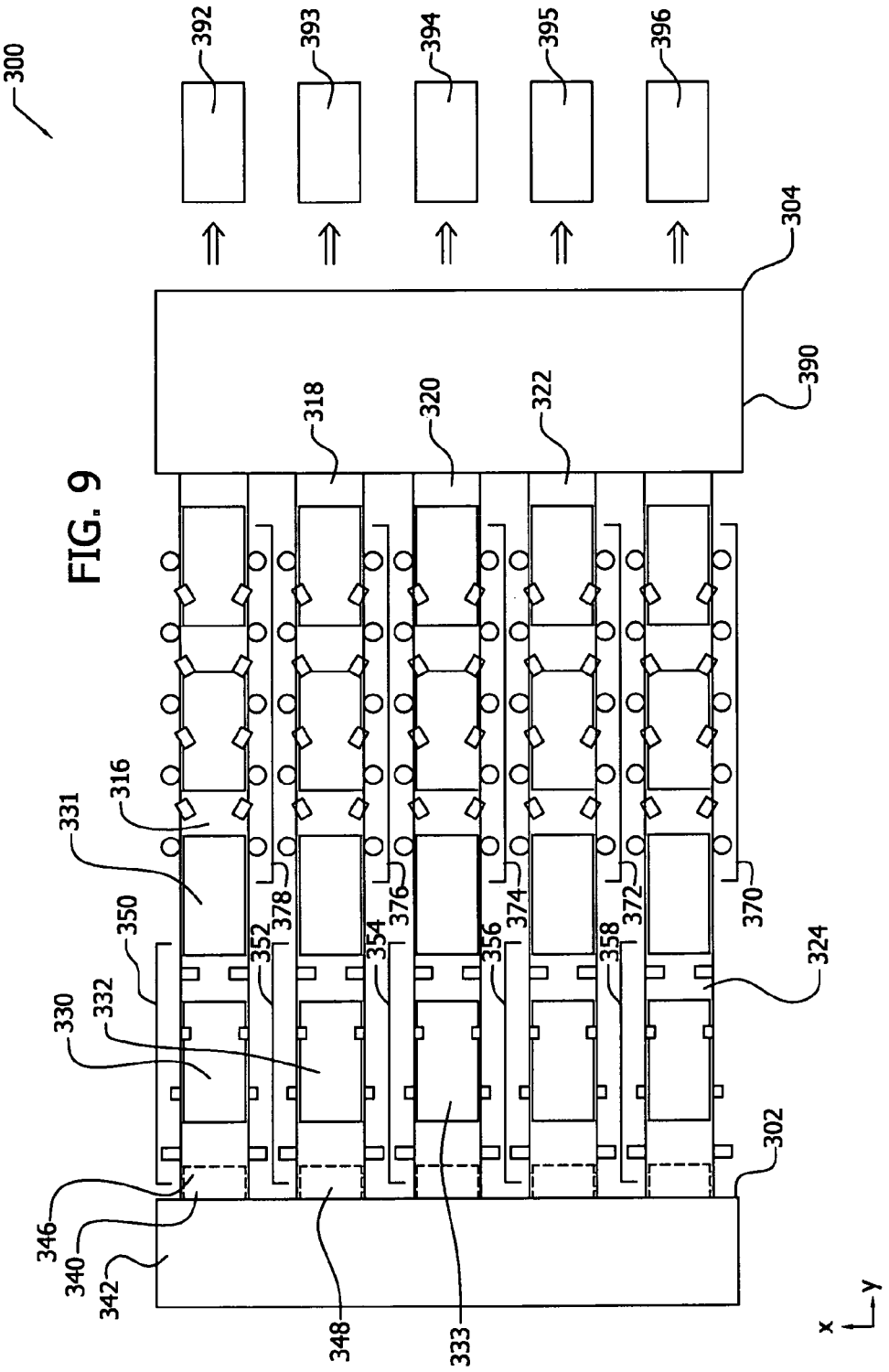

APPARATUS FOR FABRICATION OF A STRUCTURAL MEMBER AND RELATED FABRICATION METHODS

CROSS-REFERENCE TO RELATED APPLICATIONS

The present application claims priority and benefit of U.S. Provisional Patent Application No. 61/684,109 filed on 16 Aug. 2012 and entitled APPARATUS FOR FABRICATION OF A STRUCTURAL MEMBER AND RELATED METHODS, which is hereby incorporated by reference in its entirety herein.

BACKGROUND OF THE INVENTION

1. Field

Disclosed herein is an apparatus and related methods for the continuous fabrication of pre-stressed structural members from a compressible core and a cellulose-based sheet material wrapper.

2. Related Art

Shipping pallets have traditionally been made out of wood. However, the use of wood presents a number of problems. For example, wood pallets may present a hazard to workers or cause damage to the products and materials loaded upon the pallets due to splintering of the wood. The splintered wood can impale both workers and the packaging and products being transported on the pallets. In addition, wood pallets are typically assembled using fasteners such as nails or staples. Such fasteners present additional hazards that may cause injury to workers and damage to the products and packaging being transported on the pallets. Such injuries negatively impact the lives of workers and add delays and costs to product distribution. Accordingly, it would be beneficial to have a pallet that reduced or eliminated such hazards.

Similarly, wood pallets typically weigh between 40 and 65 pounds. As such, wood pallets may be cumbersome for individuals to handle even when unloaded. The weight of the pallet may cause injury to workers particularly when being manually stacked or otherwise handled after unloading. The weight also adds to shipping costs and may create other inefficiencies. For example, a trailer that is 53 feet long with a double-stacked load can include 52 pallets, which typically adds over 2500 pounds of weight per truck load. With lighter the goods, such as, for example, aluminum cans, a lighter pallet can dramatically affect the total weight of the load because of the greater proportion of weight of the wood pallets in the load relative to the goods. With heavier goods that won't permit the total volume of a trailer to be utilized because of weight restrictions, a lighter pallet will permit additional goods to be transported of light palletized loads. Regardless of the load, the weight of the traditional pallets represents a significant addition cost to shipping goods. Accordingly, it would be beneficial to have a pallet that minimized the additional weight associated with palletizing goods.

In addition, the wood used for pallets has a significant impact on the environment. The wood pallet industry currently consumes over 1 million acres of forest per year for the manufacture of new wood pallets. Depletion of natural resources, destruction of animal habitat and excessive use of energy are the obvious impacts of such harvesting. In addition, the harvested wood may be the carrier of potentially invasive species. Given that pallets are used for shipping, pallets have been implicated in the dissemination of potentially invasive species around the world. In order to prevent the importation of invasive species, certain countries are currently implementing restrictions on wood pallets or are totally banning the use of wood pallets. These restrictions may require the use of fumigation or heat-treating to kill invasive species harbored in the wood. However, these restrictions may add to the cost, environmental impact, and disposal problems associated with the use of such wood pallets. Accordingly, it may be mandatory or at least beneficial to use pallets that reduced or eliminated the need to harvest and transport wood.

Corrugated pallets fabricated from corrugated materials or other paper products represent solutions to many of the above listed problems. However many current corrugated pallets may lack the strength to be competitive with wood pallets, may be vulnerable to water damage, and may be prohibitively expensive. In addition, corrugated pallets may have unconventional configurations that may confuse forklift operators resulting in additional damage, and that may not be usable with existing storage rack systems and existing conveyor systems commonly used in manufacturing and warehousing facilities. These shortcomings may present a barrier to the widespread usage and acceptance of corrugated pallets.

Certain corrugated pallet designs have overcome many of these problems using a paper wrapper bonded to corrugated cores to form planks for fabrication of the corrugated pallet. It has been further shown that it can be advantageous to bond the paper wrapper in tension to the core. The tension may be selectable in order to impart desired structural properties to the plank. However, the manufacture of such planks with tensioned paper wrappers disposed over corrugated cores presents a number of manufacturing problems. In order to cost effectively manufacture the planks, a paper wrapper should be secured to the core surface of the core at a rapid rate. Many prior technologies for wrapping a paper wrapper over a cardboard core did not secure the paper wrapper in tension over the cardboard core. In addition, the prior technologies for wrapping paper around cores were typically too slow and expensive for efficient manufacture of planks.

Various prior plastic wrapping technologies used plastic wrappers that were highly elastic and relied on this high degree of elasticity and, typically, multiple wraps around the core to secure the wrapper over the core. These plastic-wrapping technologies did not actually bond the plastic wrapper to the cellulose-based core. The nature of the materials typically prevented this. Accordingly, the plastic was typically adhered to itself around the cores to secure the plastic wrapper about the core. This technology didn't bond the plastic to the surface of the cores to provide the additional strength advantage of the wrapper bonded to the core. Furthermore, the underlying technology was not directly or readily adaptable for use with paper due to the different physical nature of paper and other similar cellulose based sheet materials.

The limited elasticity of paper and the need to use adhesives to bond the paper wrapper directly to the core particularly present a number of distinct problems that will be readily recognized by those of ordinary skill in the art and are not resolved by prior wrapping technologies. Accordingly, it would be beneficial to have a manufacturing apparatus for the efficient and cost effective bonding of paper wrappers around cardboard cores.

BRIEF SUMMARY OF THE INVENTION

A fabrication machine and related methods and products are disclosed. The above-listed needs and disadvantages may be overcome by the fabrication machine, the related methods of use, and the related manufactures disclosed herein. Additional improvements and advantages may be recognized by those of ordinary skill in the art upon study of the present disclosure.

The fabrication machine can be adapted to generate at least a longitudinal tension in a wrapper during the bonding of the wrapper to one or more surfaces of the core. The wrappers used by the fabrication machine comprise a cellulose-based sheet material. The fabrication machine typically engages with a wrapper to impart a selected longitudinal tension to the wrapper. The fabrication machine can typically control the amount tension generated in the wrapper. In certain aspects, the force advancing the wrapper through the fabrication machine may generate the tension. Various mechanical, magnetic and electrical systems may be employed to generate the tension. One or more brakes may be employed on the spool of paper used as a wrapper, on intervening rollers through which the wrapper is wound or other mechanical, electrical or other systems to generate the desired tension in the wrapper or the braking effect the rolling resistance in the rollers may, at least in part, be employed to generate the desired tension. The longitudinal tension in the cellulose-based sheet material web can be adjustable to allow varying of tension of the wrapper as it is bonded to the core. In certain aspects, the wrapper roll may mechanically cooperation with a brake where the wrapper is being drawn from the wrapper roll as the wrapper is advanced through the fabrication machine. The fabrication machine can bond the wrapper at the selected tension about a core to form a structural member. Methods of use of the fabrication machine, and related manufactures are disclosed herein.

In certain aspects, the fabrication machine can be adapted to generate at least a peripheral tension in a wrapper during the bonding of the wrapper to one or more surfaces of the core. The fabrication machine may engage the wrapper and/or core to impart a selected peripheral tension to the wrapper as it is bonded to the core. The fabrication machine may employ on or more tensioning elements to engage the wrapper and generate a peripheral tension as it is bonded to the core. In certain aspects, the tensioning element may include one or more rollers. The rollers may be configured to engage the wrapper and generate a peripheral tension as the wrapper and core proceed through the fabrication machine. The roller(s) may be formed of rubber, plastic, or other material or combination of materials having a durometer scale value that enhances the engagement between the roller(s) and the wrapper. In some aspects, the material of which the roller(s) are formed may have a durometer value within the range of 15-70 on the OO scale (ASTM D2240). In some aspects, the material of which the roller(s) are formed may have a durometer value within the range of 25-90 on the A scale. The material of which the roller(s) are formed may be selected to enhance the frictional engagement between the roller(s) and the wrapper. The rollers may be free rolling, driven and/or may be configured to generate a desired rolling resistance such as by using brake or other resistance inducing mechanism. The rollers may be configured to engage the wrapper and core at a desired pressure. The pressure may be continuous or may be varied. The angle at which one or more rollers engage the wrapper may also be varied. The peripheral tension in the wrapper can be adjustable by varying one or more of the roller material, the roller size, the rolling resistance, the force driving the roller, the downward pressure of the roller and the angle of the roller to allow varying of the peripheral tension, and to varying degrees the longitudinal tension in the wrapper, as it is bonded to the core. The rollers may also to varying degrees be configured to impart compression to core as it is wrapped. In certain aspects, the wrapper roll may mechanically cooperation with a wrapper and core to drive the structural members through the fabrication machine.

In certain aspects, the fabrication machine may wrap a plurality of cores in parallel. After spooling off the roll, the wrapper may be split into a plurality of ribbons that proceed through the fabrication machine and are individually wrapped and bonded to cores to form the desired structural members.

This summary is presented to provide a basic understanding of some aspects of the apparatus and methods disclosed herein as a prelude to the detailed description that follows below. Accordingly, this summary is not intended to identify key elements of the apparatus, methods, and manufactures disclosed herein or to delineate the scope thereof.

BRIEF DESCRIPTION OF THE DRAWINGS

FIG. 2A illustrates by end view portions of the exemplary fabrication machine of FIG. 1 including a core-wrapper combination at a first fabrication stage;

FIG. 2B illustrates by end view portions of the exemplary fabrication machine of FIG. 1 including a core-wrapper combination at a second fabrication stage;

FIG. 2C illustrates by end view portions of the exemplary fabrication machine of FIG. 1 including a core-wrapper combination at a third fabrication stage;

FIG. 2D illustrates by end view portions of the exemplary fabrication machine of FIG. 1 including a core-wrapper combination at a fourth fabrication stage;

FIG. 2E illustrates by end view portions of the exemplary fabrication machine of FIG. 1 including a core-wrapper combination at a fifth fabrication stage;

FIG. 9 illustrates by plan view another exemplary fabrication machine;

Figure 1:
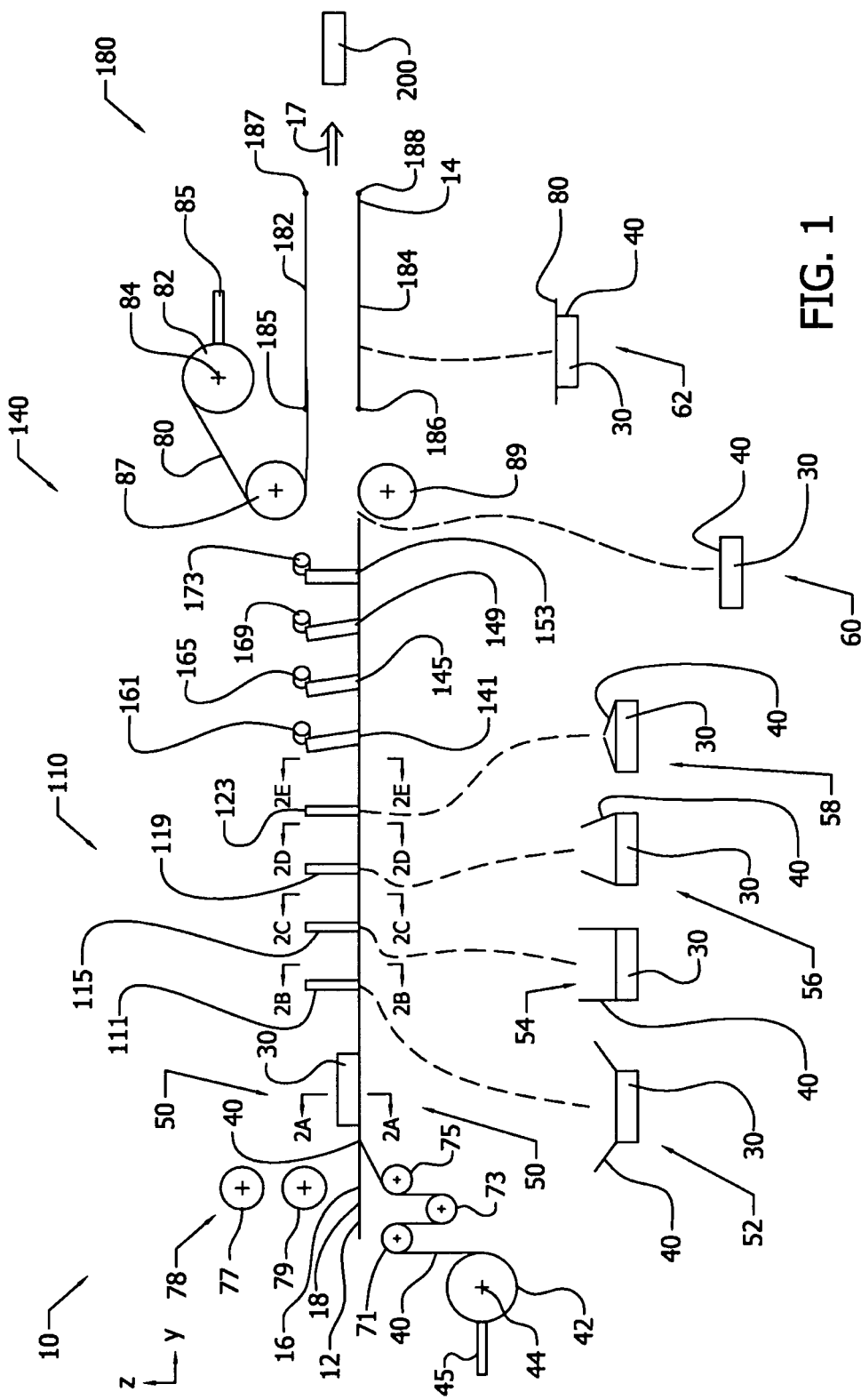
FIG. 1 illustrates by side view portions of an exemplary fabrication machine.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. When the terms "top," "bottom," "right," "left," "forward," "rear," "first," "second," "inside," "outside," and similar terms are used, such terms should be understood in reference to the orientation of the implementations shown in the drawings and are utilized only to facilitate description thereof.

DETAILED DESCRIPTION OF THE INVENTION

A fabrication machine is disclosed herein. In various aspects, the fabrication machine wraps one or more wrappers at one or more selected tensions about a core to form a structural member. In various aspects, the fabrication machine may secure a reinforcing wrapper about at least portions of the core at a selected reinforcing wrapper tension to form the structural member. The structural member formed by the fabrication machine may be used, for example, in the construction of shipping pallets. Further details of the structural element fabricated by the fabrication machine may be found in U.S. patent application Ser. No. 13/476,575 filed on 21 May 2012 and entitled SHIPPING PALLET APPARATUS AND METHOD, which is hereby incorporated by reference in its entirety herein.

The wrapper, a reinforcing wrapper, or both the wrapper and the reinforcing wrapper may be formed of a cellulose-based material such as paper. The wrapper or the reinforcing wrapper may be formed from kraft paper, in various aspects. Kraft paper, as used herein, refers to paper produced by the kraft process. Kraft paper may be characterized by long fibers and relatively low levels of lignin, which enhances bonding between fibers. Kraft paper may have suitable elastic and strength properties for the applications disclosed herein including strength in tension, flexibility, and tear resistance. The wrapper or the reinforcing wrapper may have a weight between about 50 lb. to about 69 lb., in various aspects.

The core, in various aspects, is formed from the lamination of fiberboard sheets, and the fiberboard sheets are formed as various combinations of linerboards and media. In various aspects, the media may be fluted. In various aspects, the linerboards and media are formed of cellulose-based material. In various aspects, a biodegradable adhesive may be used to secure the media and linerboards to one another, to laminate the fiberboards to one another to form the core, or to secure the wrapper to the core.

The fabrication machine tensions the wrapper to a selected tension, enfolds the core within the wrapper with the wrapper held at the selected tension, and adhesively secures the wrapper at the selected tension to the core, in various aspects. The fabrication machine may tension a reinforcing wrapper to a selected reinforcing wrapper tension and adhesively secure the reinforcing wrapper at the selected reinforcing wrapper tension to the core with the wrapper interposed between the reinforcing wrapper and the core, in various aspects.

In various aspects, the wrapper is formed into a wrapper roll. Mechanisms of the fabrication machine engage the wrapper to advance the wrapper through the machine from the wrapper roll by pulling the wrapper from the wrapper roll. In various aspects, the mechanisms may be configured as a compression table comprising one or more conveyors. In various aspects, one or more rollers may engage the wrapper to advance the wrapper from the wrapper roll.

The tension in the wrapper longitudinally (lengthwise) along the wrapper may be selected by adjustment of a brake that cooperates mechanically with the wrapper to regulate the force required to advance the wrapper through the machine. Accordingly, brake, as used herein, includes various mechanisms that regulate the force required to advance the wrapper and thus regulate the longitudinal tension in the wrapper, as the longitudinal tension in the wrapper is related to the force required to advance the wrapper and the cross-sectional dimensions of the wrapper. The brake and/or associated controllers are configured to constantly provide the desired longitudinal tension in the wrapper, in various aspects. The brake may cooperate with the wrapper roll and the brake may be adjusted to select the force required by the mechanisms of the fabrication machine to advance the wrapper from the wrapper roll, in various aspects.

The lengthwise tension in the wrapper is at least 1.0 pounds per square inch, in various aspects. In some aspects, the lengthwise tension in the wrapper is between about 2.0 pounds per square inch (psi) and 8.0 psi in the portion of the web where the core is bonded to the wrapper.

With the wrapper tensioned to the selected lengthwise tension, the fabrication machine enfolds the wrapper about the core, in various aspects. In various aspects, the fabrication machine may include one or more arms adapted to enfold the wrapper about the core. Said arms may be stationary, in some aspects, while the arms may be positionable to enfold the wrapper about the core, in other aspects. In various aspects, the fabrication machine may include one or more rollers adapted to enfold the wrapper about the core and to tension the wrapper in one or more orthogonal directions.

A reinforcing wrapper formed into a reinforcing wrapper roll may be provided, in various aspects. In various aspects, mechanisms of the fabrication machine engage the reinforcing wrapper to advance the reinforcing wrapper from the reinforcing wrapper roll by pulling the reinforcing wrapper from the reinforcing wrapper roll. In various aspects, these mechanisms may be configured as a compression table comprising one or more conveyors. The tension in the reinforcing wrapper lengthwise along the reinforcing wrapper may be selected by adjustment of a brake that cooperates mechanically with the reinforcing wrapper to regulate the force exerted by the mechanisms to draw the reinforcing wrapper through the machine from the reinforcing wrapper roll. The brake may be adjusted to select the force required by the mechanisms of the fabrication machine to advance the reinforcing wrapper through the machine, the lengthwise tension in the reinforcing wrapper being related to the force required to advance the reinforcing wrapper and the cross sectional dimensions of the reinforcing wrapper. In various aspects, the brake may cooperate with the reinforcing wrapper roll to regulate the force required to advance the wrapper through the machine from the reinforcing wrapper roll by regulating the force required to pull the wrapper from the wrapper roll. The fabrication machine, in various aspects, includes mechanisms that secure the reinforcing wrapper at the selected reinforcing wrapper tension to the wrapper and thence to the core.

The fabrication machine may include various mechanisms that apply adhesive variously to the core, the wrapper, and/or the reinforcing wrapper to secure the core, the wrapper, and/or the reinforcing wrapper to one another.

In various aspects, the fabrication machine includes mechanisms adapted to hold the wrapper at the selected wrapper tensions about the core as the adhesive cures so that the wrapper is attached to the core at the selected wrapper tensions by the cured adhesive. The mechanism that secure the wrapper, the reinforcing wrapper, or both the wrapper and reinforcing wrapper at the selected tensions about the core as the adhesive cures may be configured as a compression table, in various aspects.

FIG. 1 illustrates an implementation of fabrication machine 10 that fabricates structural member 200 from core 30 and wrapper 40. As illustrated in FIG. 1, wrapper 40 is introduced onto track 16 of fabrication machine 10 proximate machine end 12 of fabrication machine 10. Wrapper 40, in this implementation, is dispensed from wrapper roll 42 as wrapper 40 advances along track 16, and wrapper 40 generally extends from machine end 12 to machine end 14 along track 16. Wrapper roll 42 may include wrapper 40 wound about itself to form wrapper roll 42. As illustrated, wrapper roll 42 is rotatably mounted to axle 44 to allow rotation of wrapper roll 42 about axle 44 as the wrapper 40 is advanced along track 16 from wrapper roll 42. Wrapper 40 advances from wrapper roll 42, passes about tension rollers 71, 73, 75, and is then fed onto track 16, as illustrated. Rollers 71, 73, 75 may serve to maintain tension in wrapper 40 by taking up slack, orient wrapper 40, or feed wrapper 40 onto track 16. Various numbers of rollers, such as rollers 71, 73, 75, may be employed, in various implementations.

Wrapper 40, in this implementation, forms a continuous sheet of material between wrapper roll 42 and machine end 14 of fabrication machine 10. Wrapper 40 engages conveyors 182, 184 of compression table 180, and conveyors 182, 184 pull upon wrapper 40 (see FIG. 5) to advance wrapper 40 along track 16 by unwinding wrapper 40 from wrapper roll 42 onto track 16.

Brake 45, as illustrated, engages wrapper roll 42 to regulate the force with which conveyors 182, 184 pull upon wrapper 40 to advance wrapper 40 from wrapper roll 42 thereby producing tension force $T_{fy1}$ with respect to the y-axis (See FIGS. 3A & 3B) in wrapper 40 generally along the length of wrapper 40 disposed about track 16. Wrapper 40 must be pulled with tension force $T_{fy1}$ sufficient to overcome braking force applied by brake 45 to wrapper roll 42 so that wrapper roll 42 rotates about axle 44 to dispense wrapper 40 from wrapper roll 42. The engagement of brake 45 with wrapper roll 42 may be adjusted to select tension force $T_{fy1}$ in wrapper 40. It should be understood that brake 45, in various implementations, may engage wrapper roll 42, tension rollers, such as tension rollers 71, 73, 75, or otherwise engage with wrapper 40 generally proximate machine end 12 of fabrication machine 10 to regulate the force with which conveyors 182, 184 pull upon wrapper 40 to advance wrapper 40 through fabrication machine 10 along track 16 in order to produce selected tension force $T_{fy1}$ in wrapper 40.

Portions of track 16, in this implementation, are formed to have a substantially smooth surface 18 such that wrapper 40 may slide thereupon. Other portions of track 16, in this implementation, are configured as conveyor belt 182, 184 that form compression table 180. In various implementations, track 16 may be variously configured as a slidable surface, such as surface 18, conveyor(s), such as conveyors 182, 184, various rollers, combinations thereof, and so forth, as would be readily recognized by those of ordinary skill in the art upon study of this disclosure. Although illustrated as linear herein, track 16 may include various bends and so forth, in various other implementations, for example, in order to shorten the length of fabrication machine 10.

Core 30, as illustrated in FIG. 1, is introduced into fabrication machine 10 generally proximate machine end 12 by placement of core 30 upon wrapper 40. In this implementation, core 30 is placed upon wrapper 40 by engagement of core 30 between rollers 77, 79 that comprise core placement mechanism 78. The rotation of rollers 77, 79, with core 30 engaged therebetween, extrudes core 30 onto wrapper 40 which, in turn, lies upon track 16. Various other core placement mechanisms may be provided, in various other implementations, that place core 30 upon wrapper 40. Adhesive 24 is applied to core 30 by rollers 77, 79 to secure wrapper 40 to core 30 during the fabrication of structural member 200, in this implementation. In various implementations, adhesive 24 may be applied to core 30, to at least portions of wrapper 40 that may enfold core 30, or to both core 30 and at least portions of wrapper 40 that may enfold core 30 to secure wrapper 40 to core 30. The adhesive 24 may be applied by fabrication machine 10 to core 30, wrapper 40, or both core 30 and wrapper 40 generally proximate to machine end 12 of fabrication machine 10, and the adhesive 24 may be applied to core 30, wrapper 40, or both core 30 and wrapper 40 generally concurrent to the placement of core 30 upon wrapper 40. The adhesive 24 may be applied to core 30, the wrapper 40, or both core 30 and wrapper 40 by roller, by spray onto core 30, by brush, or by combinations thereof, in various implementations. Adhesive, such as adhesive 24, may be applied, for example; to the core 30 or to the wrapper 40 at various other locations along track 16, in other implementations. In certain aspects, the adhesive 24 is applied as a continuous layer across one or more of the surfaces of core 30 to provide a continuous bond between the one or more surfaces of the core 30 and the wrapper. A continuous bond between the tensioned wrapper 40 and the one or more surfaces of the core 30 may result in a stronger structural member, a more durable structural member and/or a wrapper that is more resistant to tearing.

The flow of materials including core 30 and wrapper 40, in the implementation of FIG. 1, is generally from machine end 12 to machine end 14; as indicated by arrow 17. Core 30 and wrapper 40 enter machine 10 proximate machine end 12, and finished structural member 200, which is formed from core 30 and wrapper 40, is generally emanated from fabrication machine 10 proximate machine end 14. Core 30, in the illustration of FIG. 1, is located proximate machine end 12, but it should be understood that, as fabrication machine 10 forms core 30 and wrapper 40 into structural member 200, core 30 and wrapper 40 are advanced from machine end 12 to machine end 14. A number of cores, such as core 30, may be emplaced simultaneously upon wrapper 40 along track 16, and these cores in conjunction with the wrapper 40 may be in various stages of fabrication into structural members, such as structural member 200.

An orthogonal Cartesian coordinate system is defined herein with the x-axis oriented transverse to track 16, the y-axis oriented longitudinally along track 16 in the direction of the flow of materials as indicated by arrow 17, and the z-axis oriented normal to track 16. This orthogonal Cartesian coordinate system is included in the specification and Figures in order to facilitate description.

As illustrated in FIG. 1, core 30 and wrapper 40 pass between at least fabrication stages 50, 52, 54, 56, 58, 60, and 62 as core 30 and wrapper 40 are formed into structural member. 200 by fabrication machine 10. FIG. 1 illustrates the position of wrapper 40 about core 30 at fabrication stages 52, 54, 56, 58, 60, and 62 in the detailed illustrations presented below track 16, and the proximate location of fabrication stages 52, 54, 56, 58, 60, and 62 along track 16 is indicated in FIG. 1 by the dashed lines between the detailed illustrations of fabrication stages 52, 54, 56, 58, 60, and 62 and track 16 of fabrication machine 10. Fabrication stages 52, 54, 56, 58, 60 are illustrated by end view from the viewpoint indicated by the corresponding break lines in FIG. 1. Fabrication stage 62 is illustrated by side view in FIG. 1, and further includes the position of reinforcing wrapper 80.

FIG. 1 illustrates core 30 emplaced upon wrapper 40 proximate machine end 12 of fabrication machine 10, which is denoted as fabrication stage 50. Wrapper 40 lies generally flat upon track 16 with core 30 resting thereupon at fabrication stage 50. Wrapper 40, in this implementation, forms a continuous sheet of material between wrapper roll 42 and machine end 14 of fabrication machine 10. Wrapper 40 with core 30 resting thereupon may be advanced along track 16 by pulling wrapper 40 generally from machine end 14 of fabrication machine 10, which unwinds wrapper 40 from wrapper roll 42.

As the wrapper 40 is advanced along track 16, as illustrated in FIG. 1, core 30 and the portion of wrapper 40 proximate core 30 move through arm set 110 (also see FIGS. 2B, 2C, 2D, 2E). Arm set 110 includes arms 111, 113, 115, 117, 119, 121, 123, 125 that are configured to fold wrapper 40 about core 30 as core 30 and wrapper 40 move through arm set 110, in this implementation. As core 30 and wrapper 40 moves through arm set 110, arms 111, 113 (see FIG. 2B), arms 115, 117 (see FIG. 2C), arms 119, 121 (see FIG. 2D), and arms 123, 125 (see FIG. 2E) engage wrapper 40 in succession to deploy wrapper 40 around core 30 such that wrapper 40 enfolds increasing portions of core 30 at fabrication stages 52, 54, 56, and 58, respectively, as illustrated. Other implementations may include more or fewer arms, such as arms 111, 113, 115, 117, 119, 121, 123, 125, or other mechanisms adapted to fold wrapper 40 about core 30.

As illustrated in FIG. 1, core 30 generally enfolded by wrapper 40 exits arm set 110 at fabrication stage 58 and then enters roller set 140. Roller set 140 (see FIGS. 3A, 3B) may complete the enfoldment of wrapper 40 around core 30, and roller set 140 may tension wrapper 40 about core 30. The adhesive, such as adhesive 24, may be uncured as the assembled core 30 and wrapper 40 is processed by roller set 140 so that roller set 140 may position wrapper 40 about core 30 including the peripheral tensioning of wrapper 40 about core 30. Fabrication stage 60, as illustrated in FIG. 1, includes wrapper 40 tensioned peripherally about core 30 by roller set 140 over at least one surface of the core 30.

Optionally, the assembled core 30 and wrapper 40 at fabrication stage 60 passes from roller set 140 and then passes between rollers 87, 89 that apply adhesive, such as adhesive 24, and reinforcing wrapper 80 over the portions of wrapper 40 that are adhesively attached to side 37 of core 30. Reinforcing wrapper 80 is adhesively secured to side 49 of wrapper 40 that is, itself, adhesively secured to side 37 of core 30, in this implementation.

Reinforcing wrapper 80, in this implementation, is dispensed from reinforcing wrapper roll 82 as reinforcing wrapper 80 is advanced along track 16. Reinforcing wrapper roll 82 may include reinforcing wrapper 80 wound about itself to form reinforcing wrapper roll 80. As illustrated, reinforcing wrapper roll 82 is rotatably mounted to axle 84 to allow rotation of reinforcing wrapper roll 82 about axle 84 as the reinforcing wrapper 80 is advanced along track 16 from reinforcing wrapper roll 82. Reinforcing wrapper 80 advances from reinforcing wrapper roll 82 and passes about roller 87, and roller 87 adhesively attaches reinforcing wrapper 80 to wrapper 40 with wrapper 40 being disposed about side 37 of core 30, as illustrated.

Reinforcing wrapper 80, in this implementation, forms a continuous sheet of material between reinforcing wrapper roll 82 and machine end 14 of fabrication machine 10. Conveyor 182 of compression table 180 engages reinforcing wrapper 80 proximate rollers 87, 89 to advance reinforcing wrapper 80 from reinforcing wrapper roll 82. Brake 85 engages reinforcing wrapper roll 82 to regulate the force with which conveyor 182 pulls upon reinforcing wrapper 80 to advance reinforcing wrapper 80 from reinforcing wrapper roll 82 thereby producing tension force $T_{fy2}$ with respect to the y-axis (see FIGS. 5, 8A) in reinforcing wrapper 80 generally along the length of reinforcing wrapper 40. The engagement of brake 85 with reinforcing wrapper roll 82 may be adjusted to select the tension force $T_{fy2}$ developed in reinforcing wrapper 80. Other implementations may not include reinforcing wrapper 80 and associated mechanisms such as rollers 87, 89, brake 85, and reinforcing wrapper roll 82.

The combined core 30, wrapper 40, and reinforcing wrapper 80 enters compression table 180 following attachment of the reinforcing wrapper 80 to wrapper 40 and, thus, to core 30 at rollers 87, 89. Compression table 180 secures the assembled core 30-wrapper 40 at fabrication stage 60 between conveyors 182, 184 to allow adhesive 24 to cure. Conveyor 182 is spooled between axles 185, 187 and conveyor 184 is spooled between axles 186, 188, as illustrated. Conveyor 182 secures the reinforcing wrapper 80, wrapper 40, and core 30 in place with respect to one another and advance the reinforcing wrapper 80—wrapper 40—core 30 combination to machine end 14 of fabrication machine 10. Conveyors 182, 184 may generally advance in unison with one another to eliminate imposition of various forces upon the assembled core 30—wrapper 40—reinforcing wrapper 80 combinations that might disrupt this assembled core 30—wrapper 40—reinforcing wrapper 80 combination.

Compression table 180 secures reinforcing wrapper 80 at tension force $T_{fy2}$ to wrapper 40 while adhesive, such as adhesive 24, that secures reinforcing wrapper 80 to wrapper 40 cures. Wrapper 40 is secured in tension force $T_{fy1}$ about core 30 by the now cured adhesive 24 as the assembly of core 30, and reinforcing wrapper 80 is secured to portions of wrapper 40 and thence to side 37 of core 30 at force $T_{fy2}$. One or more cutters (not shown) may cut wrapper 40, reinforcing wrapper 80, or both wrapper 40 and reinforcing wrapper 80 proximate sides 31, 33 of core 30 to form structural member 200 proximate machine end 14 of fabrication machine 10. Other mechanisms (not shown) may be provided proximate machine end 14 of fabrication machine 10 to fold wrapper 40, reinforcing wrapper 80, or both wrapper 40 and reinforcing wrapper 80 over sides 31, 33 of core 30 and to secure adhesively wrapper 40, reinforcing wrapper 80, or both wrapper 40 and reinforcing wrapper 80 to sides 31, 33.

FIGS. 2A-2E illustrate core 30 and wrapper 40 at fabrication stages 50, 52, 54, 56, 58, respectively. As illustrated in FIG. 2A, side 39 of core 30 rests upon side 47 of wrapper 40 and side 49 of wrapper 40 rests upon surface 18 of track 16. Surface 18 of track 16 is generally formed as a smooth surface, in this implementation, so that side 49 of wrapper may slide upon surface 18 as wrapper 40 is advanced along track 16. Adhesive 24 is shown on side 37 of core 30 for illustrative purposes, but it should be understood that adhesive 24 may be applied variously about at least portions of sides 31, 32, 33, 34, 37, 39 of core 30 as well as about at least portions of side 47 of wrapper 40, in various implementations, to secure wrapper 40 to core 30. Adhesive may be applied at various stages of manufacture of structural member 200 at various locations along track 16, and various rollers, brushes, sprayers, and so forth may be provided at these locations to apply the adhesive. At fabrication stage 50, as illustrated, side 49 of wrapper 40 between edges 46, 48 of wrapper 40 lies generally flat upon surface 18 of track 16. Adhesive 24 may be interposed between side 39 of core 30 and side 47 of wrapper 40 to secure side 39 of core 30 to side 47 of wrapper 40.

FIG. 2B illustrates core 30 and wrapper 40 at fabrication stage 52. As illustrated, portions of side 49 of wrapper 40 biases against arms 111, 113 so that arms 111, 113 cause wrapper 40 to enfold not only side 39 of core 30 but also portions of sides 32, 34 of core 30. Arms 111, 113 are set at acute angle $\alpha_1$ with respect to surface 18, as illustrated. Adhesive 24 may be interposed between sides 32, 34 of core 30 and side 47 of wrapper 40 to secure sides 32, 34 of core 30 to side 47 of wrapper 40.

FIG. 2C illustrates core 30 and wrapper 40 at fabrication stage 54. As illustrated, portions of side 49 of wrapper 40 biases against arms 115, 117 so that arms 115, 117 cause wrapper 40 to further enfold portions of sides 32, 34 of core 30 in comparison to fabrication stage 52. As illustrated, arms 115, 117 are set at angle $\alpha_2$, which equals approximate 90° with respect to surface 18, in this illustrated implementation. Portions of wrapper 40 proximate ends 46, 48 extend generally vertically against sides 32, 34 of core 30, as illustrated.

FIG. 2D illustrates core 30 and wrapper 40 at fabrication stage 56. As illustrated, portions of side 49 of wrapper 40 biases against arms 119, 121 so that arms 119, 121 cause wrapper 40 to enfold portions of side 37 of core 30. As illustrated, arms 119, 121 are set at angle $\alpha_3$, which is an obtuse angle with respect to surface 18, as illustrated. Portions of wrapper 40 extend generally vertically against sides 32, 34 and portions of wrapper 40 proximate ends 46, 48 generally partially enfold side 37 of core 30, as illustrated.

FIG. 2E illustrates core 30 and wrapper 40 at fabrication stage 58. As illustrated in FIG. 2E, portions of side 49 of wrapper 40 biases against arms 123, 125 so that arms 123, 125 cause wrapper 40 to further enfold side 37 of core 30 in comparison to fabrication stage 56. As illustrated, arms 123, 125 are set to overhang portions of side 37, in this implementation. Portions of wrapper 40 extend generally vertically against sides 32, 34 and portions of wrapper 40 proximate ends 46, 48 generally partially enfold side 37 of core 30, as illustrated. Adhesive 24 may be interposed between side 37 of core 30 and side 47 of wrapper 40 to secure side 37 of core 30 to side 47 of wrapper 40.

Figure 3A:
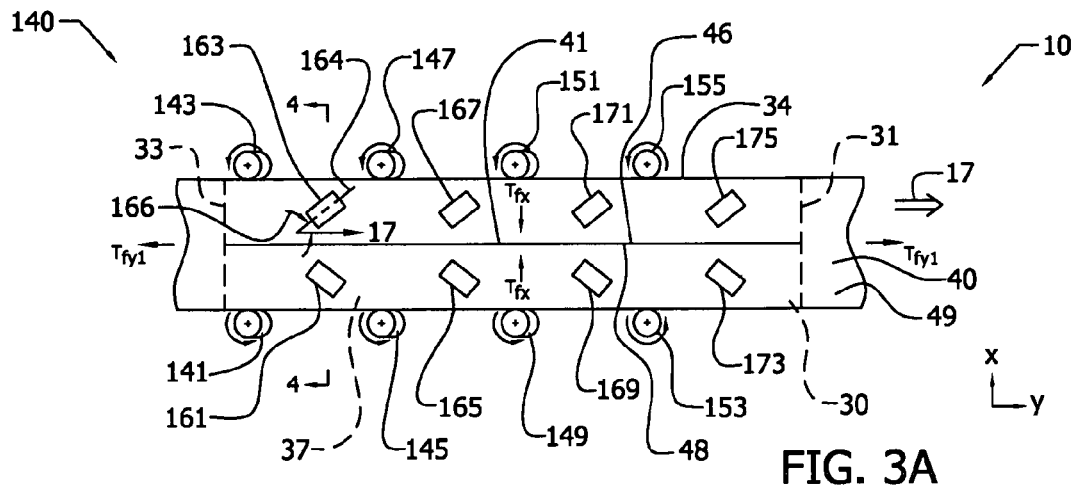
FIG. 3A illustrates by top view portions of the exemplary fabrication machine of FIG. 1.
Figure 3B:
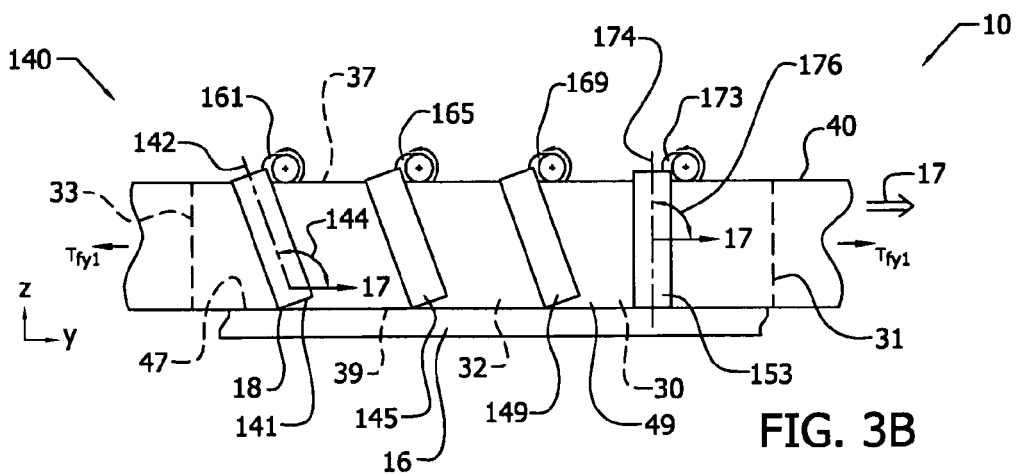
FIG. 3B illustrates by side view portions of the exemplary fabrication machine of FIG. 1.

FIGS. 3A and 3B illustrate the core 30 and wrapper 40 assembly being processed by roller set 140. The core 30 and wrapper 40 assembly, in this implementation, passes from arm set 110 into roller set 140 generally at fabrication stage 58. Roller set 140 may then engage wrapper 40 to further tension wrapper 40 about core 30.

As illustrated in FIGS. 3A and 3B, side rollers 141, 145, 149, 153, 143, 147, 151, 155 and top rollers 161, 163, 165, 167, 169, 171, 173, 175 of roller set 140 use the flow of the wrapper 40 (the direction of material flow of wrapper 40 and core 30 is indicated by arrow 17), the angles of side rollers 141, 145, 149, 153, 143, 147, 151, 155 and top rollers 161, 163, 165, 167, 169, 171, 173, 175 with respect to the flows of wrapper 40, and pressure applied by side rollers 141, 145, 149, 153, 143, 147, 151, 155 and top rollers 161, 163, 165, 167, 169, 171, 173, 175 against the core 30 to draw the wrapper 40 around core 30 in the z-direction and in the x-direction, respectively, to tension wrapper 40 to tension $T_{fz}$ in the z-axial direction and to tension wrapper 40 to tension $T_{fx}$ in the x-axial direction. In this implementation, the top rollers are in alternating placement with respect to the side rollers so that side rollers 141 143 engage wrapper 40 and core 30, then top rollers 161, 163 engage wrapper 40 and core 30, followed by side rollers 145 147, and so forth in succession.

Core 30, as illustrated in FIGS. 3A and 3B, is held between side rollers 141, 145, 149, 153 and side rollers 143, 147, 151, 155. With core 30 held between side rollers 141, 145, 149, 153 and side rollers 143, 147, 151, 155, side rollers 141, 145, 149, 153 and side rollers 143, 147, 151, 155 engage wrapper 40 frictionally to draw wrapper over the core generally in the z direction as shown. Core 30 is compressed in the x-direction between side rollers 141, 145, 149, 153 and side rollers 143, 147, 151, 155. Accordingly, side rollers 141, 145, 149, 153 and side rollers 143, 147, 151, 155 apply a tension $T_{fz}$ in the z-axial direction to wrapper 40 and a compressive force $C_{fx}$ in the x-axial direction (see also FIG. 4) to the core 30.

As illustrated in FIGS. 3A and 3B, core 30 is held between top rollers 161, 165, 169, 173, 163, 167, 171, 175 and track 16, so that top rollers 161, 165, 169, 173, 163, 167, 171, 175 compress core with compressive force $C_{fz}$ in the z-axial direction to the core 30.

Top rollers 161, 165, 169, 173 engage wrapper 40 to draw edge 48 in the x-direction and top rollers. 163, 167, 171, 175 engage wrapper 40 to draw edge 46 in the x-direction opposite to the direction that edge 48 is drawn so that edge 48 and edge 46 are drawn toward one another by top rollers 161, 165, 169, 173 and top rollers 163, 167, 171, 175, respectively, thereby drawing wrapper 40 peripherally around core 30 and imparting tensions $T_{fx}$, $T_{fz}$, in wrapper 40 peripherally around the core 30.

Note that top rollers 161, 165, 169, 173, 163, 167, 171, 175 draw edges 46, 48 toward one another, additional tension $T_{fz}$, may be introduced into wrapper 40 and additional compression force $C_{fz}$, in core 30 beyond the tension and compression introduced into wrapper 40 and core 30, respectively, by side rollers 141, 145, 149, 153 143, 147, 151, 155. Accordingly, side rollers 141, 145, 149, 153, 143, 147, 151, 155 cooperate with top rollers 161, 165, 169, 173, 163, 167, 171, 175 to tension the wrapper 40 to tensions $T_{fx}$, $T_{fz}$ peripherally around core 30 while inducing corresponding compression forces $C_{fx}$, $C_{fz}$, in core 30. Engagement of the wrapper 40 with top rollers 161, 165, 169, 173, 163, 167, 171, 175 and with side rollers 141, 145, 149, 153, 143, 147, 151, 155 may serve to introduce tension in the y-axial direction into wrapper 40 as wrapper 40 is enfolded by top rollers 161, 165, 169, 173, 163, 167, 171, 175 and side rollers 141, 145, 149, 153, 143, 147, 151, 155 about core 30.

The angles of top rollers 161, 163, 165, 167, 169, 171, 173, 175 with respect to the flow of wrapper 40 along track 16 may be adjustable, in various implementations, and the angles may be adjusted according to the specific material characteristics of various wrappers, such as wrapper 40, and cores, such as core 30, being processed by fabrication machine 10, the speed of the wrapper along track 16, and the desired tensions $T_{fx}$, $T_{fz}$ in wrapper 40.

The axes of rotation of top rollers 161, 163, 165, 167, 169, 171, 173, 175 are illustrated canted at an angle of about 60° with respect to the x-axis that corresponds to a top roller angle about 30° with respect to the y-axis (the direction of material flow), in this implementation. For example, top roller 163 defines top roller angle 166, which lies in the x-y plane, as the angle of the axis of rotation 164 of top roller 163 with respect to the y-axis with the axis of rotation 164 pointing outward generally from seam 41. Note that the y-axis points in the direction of material flow. The top roller angle 166, as illustrated in FIG. 3A, is about 30°. In various other implementations, top roller angle 166 may be generally between 5° and 85°. The top roller angle may vary between the various top rollers.

The axes of rotation of side rollers 141, 143, 145, 147, 149, 151 are canted at a side roller angle of about 120° in an y-z plane with respect to the y-axis in the direction of material flow, in this implementation. For example, the side roller angle 144 of side roller 141 is defined as the angle between axis of rotation 142 of side roller 141 and the direction of material flow 17, with axis of rotation 142 pointing outward from track 16, as illustrated. The side roller angle, such as side roller angle 144, may assume other angles in other implementations. The side roller angle may be between 95° and 175° or may be between 120° and 165°, in various implementations. The side roller angle may vary between side rollers. The axes of rotation of side rollers 153, 155 are generally aligned with the z-axis, so that the side roller angles 176 of side rollers 153, 155 are 90°, in this implementation. Side angle 176 is defined between axis of rotation 174 and y-axis, as shown. Side angle 176 may assume other values in other implementations.

Side rollers 141, 143, 145, 147, 149, 151, 153, 155 and top rollers 161, 163, 165, 167, 169, 171, 173, 175 freely rotate about their respective axes in the directions indicated by frictional engagement with wrapper 40, in this implementation. More or fewer rollers may be provided, in other implementations. In various implementations, the rollers may have various orientations or combinations of orientations. In various implementations, the rollers may rotate freely, the rollers may be in powered rotation about their axes as driven by one or more motors, or combinations thereof.

In various implementations, the resistance of the rollers, such as side rollers 141, 143, 145, 147, 149, 151, 153, 155 and top rollers 161, 163, 165, 167, 169, 171, 173, 175, may be adjustable to set the frictional force of the wrapper 40 on the rollers required to rotate the rollers. In such implementations, the tension in wrapper 40 in x, y, or z directions may be selected in part by control of the rotational resistance of side rollers 141, 143, 145, 147, 149, 151, 153, 155 or the rotational resistance of top rollers 161, 163, 165, 167, 169, 171, 173, 175. For example, by selecting the rotational resistance of top rollers 161, 163, 165, 167, 169, 171, 173, 175 the tension in x and y directions in portions of wrapper 40 appended about side 37 of core 30 may be selected. Selection of the angle(s) with respect to the x, y, and z directions at which side rollers 141, 143, 145, 147, 149, 151, 153, 155 or top rollers 161, 163, 165, 167, 169, 171, 173, 175 are set may allow selection of the tension in wrapper 40 or portions of wrapper 40 in the x, y, or z directions, and the angle(s) may be adjustable in various implementations.

Figure 4:
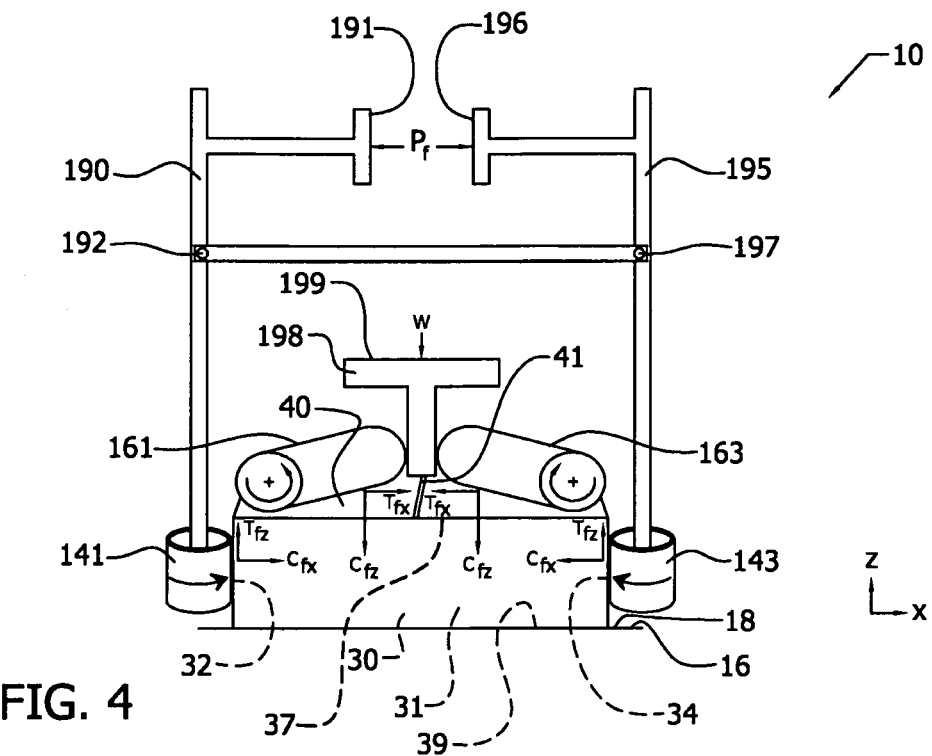
FIG. 4 illustrates by side view portions of the exemplary fabrication machine of FIG. 1.

FIG. 4 illustrates portions of fabrication machine 10 that apply forces to side rollers 141, 143, 145, 147, 149, 151, 153, 155 and to top rollers 161, 163, 165, 167, 169, 171, 173, 175. As illustrated beam 190 is pivotally mounted about pivot 192 and mechanically connects to roller 141. Beam 195 is pivotally mounted about pivot 197 and mechanically connects to roller 143, as illustrated. Application of pressure force $P_f$ to face 191 of beam 190 and to face 196 of beam 195 cause beams 190, 195 to pivot about pivots 192, 197, respectively such that side rollers 141, 143 are biased against sides 32, 34 of core 30 with wrapper 40 interposed therebetween. Core 30 is accordingly compressed between side rollers 141, 143 to compressive force $C_{fx}$ and tension force $T_{fx}$ is induced, at least in part, into wrapper 40, as illustrated. The magnitude of compressive force $C_{fx}$ may be regulated by regulation of pressure force $P_f$ applied to faces 191, 196, in this implementation, so that compressive force $C_{fx}$ may be selected by selection of the corresponding pressure force $P_f$. The pressure force $P_f$, and, hence, the compressive force $C_{fx}$ may be selected based upon the properties of the core 30 and wrapper 40 as well as properties desired in the resulting structural member 200.

For example, pressure force $P_f$ may be applied to faces 191, 196 using compressed fluid such as, for example, compressed air or hydraulic fluid. As the areas of faces 191, 196 may be generally equal, the application of compressed fluid forces to faces 191, 196 may result in generally equivalent opposing forces being applied to core 30 by rollers 141, 143.

For the sake of clarity, only side rollers 141, 143 are illustrated as mechanically connected to beams 190, 195, respectively, in FIG. 4, but it should be understood that various combinations of side rollers 141, 145, 149, 153, may be mechanically connected to beam 190, and various combinations of side rollers 143, 147, 151, 155 may be mechanically connected to beam 195, in various implementations. In various implementations, several beams such as beams 190, 195, may be provided and various combinations of side rollers, such as side rollers 141, 143, 145, 147, 149, 151, 153, 155 may be connected to these beams in various combinations to compress adjustably the core 30 therebetween.

Beam 198, as illustrated in FIG. 4, mechanically cooperates with top rollers 161, 163 such that weight force W applied to face 199 is transmitted to rollers 161, 163 to compress core 30 between rollers 161, 163 and surface 18 of track 16 with wrapper 40 surrounding sides 32, 34, 37, 39 of core. Accordingly, core 30 is tensioned at corresponding compression force $C_{fz}$. The magnitude of compression force $C_{fz}$ may be regulated by regulation of the magnitude of weight force W applied to face 199 of beam 198, in this information. Accordingly, the compression force $C_{fz}$ is selectable in this implementation, and the compression force $C_{fz}$ may be selected by selection of the corresponding weight W. The weight W and the corresponding compression force $C_{fz}$ may be selected according to the mechanical properties desired in the resulting structural member 200 as well as the properties of core 30 and wrapper 40.

Weight W may be applied to face 199, for example, using hydraulic fluid, compressed air or other gasses, or placement of a weight upon face 199. Beam 199 is illustrated as coupled only to rollers 161, 163 for the sake of clarity, but it should be understood that beam 199 may be coupled to top rollers 161, 163, 165, 167, 169, 171, 173, 175 to distribute weight force W to top rollers 161, 163, 165, 167, 169, 171, 173, 175. Other implementations may utilize various numbers of beams, such as beam 198, and the beam(s) may be mechanically connected to various combinations of top rollers, such as top rollers 161, 163, 165, 167, 169, 171, 173, 175. Other mechanisms, as would be readily recognized by those of ordinary skill in the art upon study of this disclosure, may be utilized to selectively force rollers, such as rollers 141, 143, 145, 147, 149, 151, 153, 155, 161, 163, 165, 167, 169, 171, 173, 175, against a core, such as core 30 with a wrapper, such as wrapper 40 interposed therebetween to tension the wrapper about the core with selected tension forces $T_{fx}$, $T_{fz}$, and compression forces $C_{fx}$, $C_{fz}$ in various other implementations. The tension forces $T_{fx}$, $T_{fz}$, and compression forces $C_{fx}$, $C_{fz}$ in may be monitored, and the weight W or the pressure force $P_f$ may be adjusted in response to the measured tension forces $T_{fx}$, $T_{fz}$, or measured compression forces $C_{fx}$, $C_{fz}$ in to maintain the tension forces $T_{fx}$, $T_{fz}$, or compression forces $C_{fx}$, $C_{fz}$ at the selected values. Accordingly, various sensors, microprocessors, controls, and so forth may be provided about fabrication machine 10 to regulate the operation thereof, as would be readily recognized by those of ordinary skill in the art upon study of this disclosure.

Figure 5:
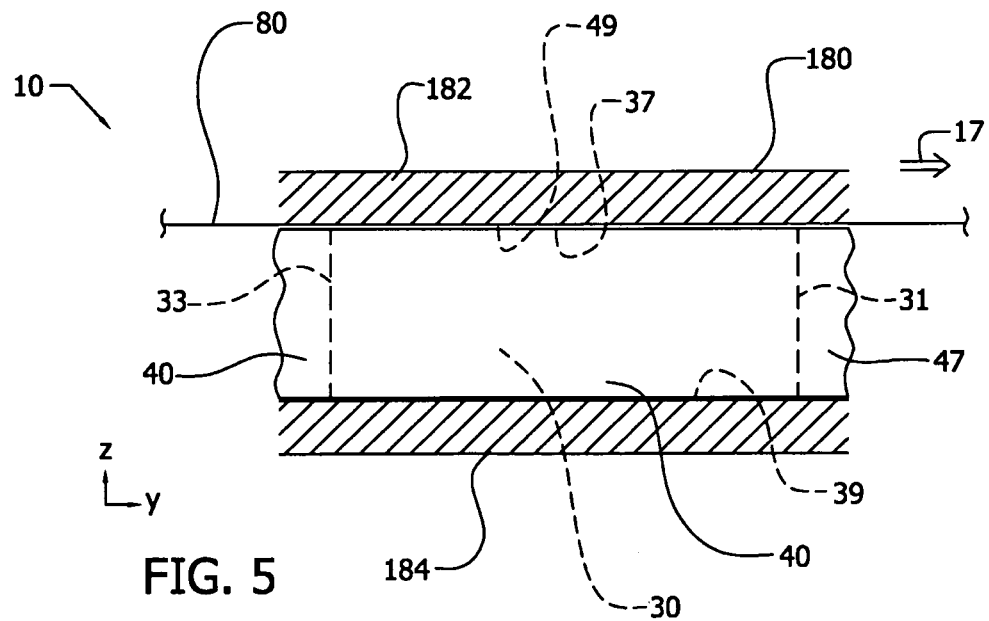
FIG. 5 illustrates by side view portions of the exemplary fabrication machine of FIG. 1.

FIG. 5 illustrates the exemplary reinforcing wrapper 80—wrapper 40—core 30 assembly between conveyor 182 and conveyor 184 of compression table 180. As illustrated, conveyors 182, 184 grip wrapper 40 and reinforcing wrapper 80 to advance wrapper 40 and reinforcing wrapper 80 from wrapper roll 42 and reinforcing wrapper roll 82, respectively. Brake 45 sets tension force $T_{fy1}$, developed in wrapper 40 as conveyors 182, 184 advance wrapper 40 from wrapper roll 42. Brake 85 sets the tension force $T_{fy2}$, developed in reinforcing wrapper as conveyors 182, 184 advance reinforcing wrapper 80 from reinforcing wrapper roll 82. Accordingly, tension forces $T_{fy1}$, $T_{fy2}$ may be selected by adjustment of brake 45 and adjustment of brake 85, respectively. Compression table 140 holds wrapper 40 at tensions $T_{fx}$, $T_{fz}$, which were developed by roller set 140. As the assembled reinforcing, wrapper 80—wrapper 40—core 30 is advanced by conveyors 182, 184 of compression table, adhesive 24 cures so that the assembled reinforcing wrapper 80—wrapper 40—core 30 is fixed with respect to one another by the now cured adhesive 24 as the assembled reinforcing wrapper 80—wrapper 40—core 30 exits the compression table 180. Upon exit from compression table 180, wrapper 40 is secured in tension about core 30 by the cured adhesive 24 at tension forces $T_{fx}$, $T_{fz}$, and $T_{fy1}$ and the cured adhesive 24 secures reinforcing wrapper 80 in tension about side 37 of core 30 at tension force $T_{fy2}$.

As illustrated in FIG. 5, wrapper 40 envelops core 30 and reinforcing wrapper 80 is secured to the portion of wrapper 40 that is secured to side 37 of core 30 so that reinforcing wrapper 80 is secure to side 37 of core 30 with portions of wrapper 40 interposed between reinforcing wrapper 80 and side 37 of core 30. Reinforcing wrapper 80 may cover seam 41, in various implementations.

Figure 6A:
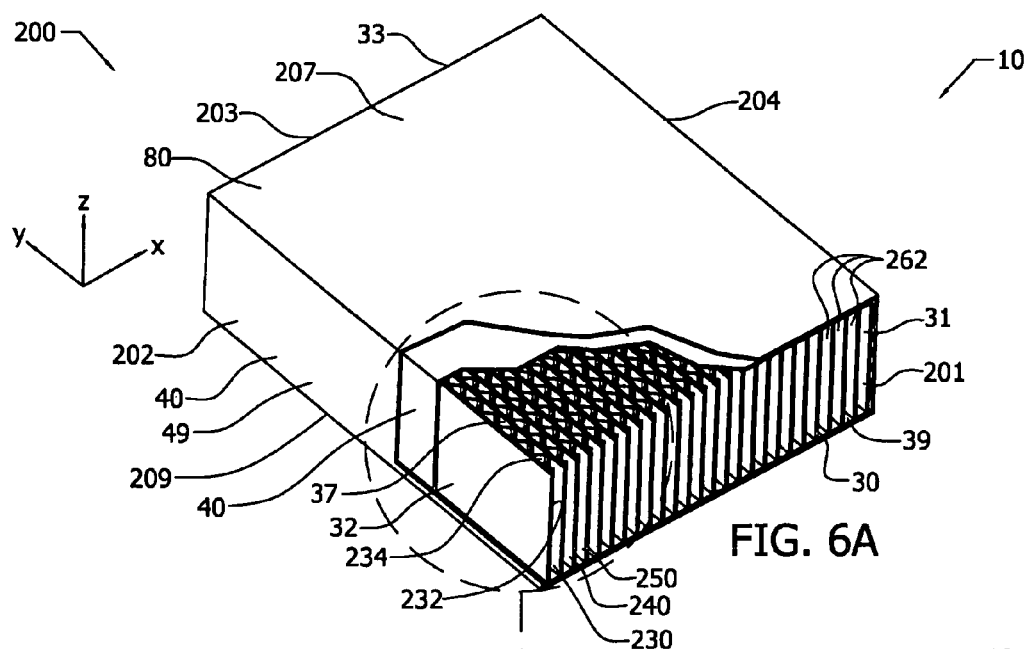
FIG. 6A illustrates by cut-away perspective view an exemplary structural member formed using the exemplary fabrication machine of FIG. 1.

An exemplary implementation of structural member 200 is illustrated in FIG. 6A. For purposes of description, the structural member 200, as illustrated, is generally aligned with the x, y, z coordinate system. Structural member 200, as illustrated, has a generally rectangular shape and rectangular cross-section and defines sides 201, 202, 203, 204, 207, 209, as illustrated. Wrapper 40 envelops ides 32, 34, 37, 39 of core 30, as illustrated. Reinforcing wrapper 80, in this implementation, is secured to side 37 of core 30 with portions of wrapper 40 interposed between reinforcing wrapper 80 and side 37 of core 30. Although side 31 of core 30 is exposed in this illustrated implementation, side 31, side 33, or both sides 31, 33 may be enveloped by wrapper 40, reinforcing wrapper 80, or combinations of wrapper 40 and reinforcing wrapper 80, in various implementations.

Figure 6B:
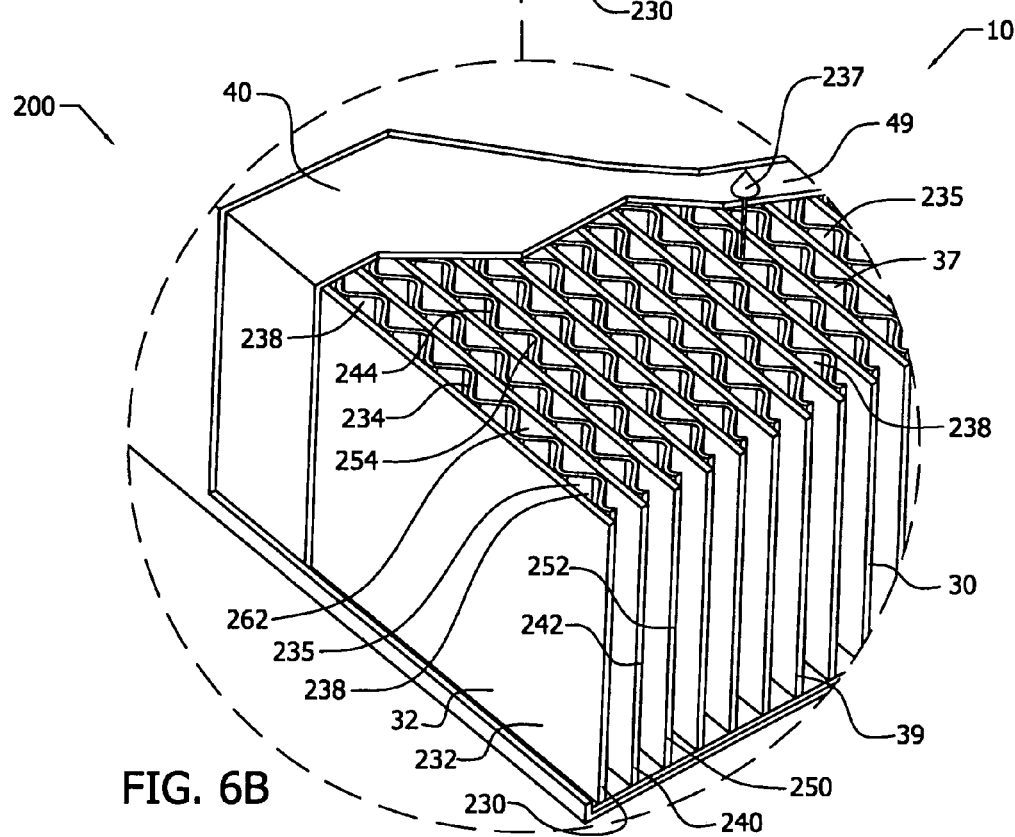
FIG. 6B illustrates by cut-away perspective view portions of the exemplary structural member of FIG. 6A.

FIG. 6B illustrates portions of structural member 200 of FIG. 6A including core 30. As illustrated in FIG. 6B, core 30 is formed as a lamination of a number of fiberboard sheets such as fiberboard sheets 230, 240, 250. Fiberboard sheets 230, 240, 250 include linerboards 232, 242, 252 with mediums 234, 244, 254, respectively. The fiberboard sheets that form core 30, such as fiberboard sheets 230, 240, 250 are positioned with respect to one another such that the linerboards, such as linerboards 232, 242, 252, lie in a spaced parallel orientation and the mediums, such as mediums 234, 244, 254 lie in a spaced parallel orientation. Each fiberboard sheet in core 30 is biased against the adjacent fiberboard sheet or fiberboard sheets in the lamination, as illustrated, and the fiberboard sheets are aligned to define a substantially planar side 37 of core 30, as illustrated. Side 37 of core 30 in combination with the wrapper 40 and reinforcing wrapper 80 defines side 207 of structural member 200, which is substantially planar in this implementation.

As illustrated in FIG. 6B, medium 234 of fiberboard sheet 230 is secured to linerboard 242 of fiberboard sheet 240, medium 244 of fiberboard sheet 240 is secured to linerboard 252 of fiberboard sheet 250, and so forth, thereby forming the core 30. Various adhesive(s) may be used to secure the linerboards and mediums to one another.

Mediums, such as mediums 234, 244, 254, are formed into flutes, such as flute 235 (e.g. fluted medium), with open ends, such as open end 238, at core sides 37, 39 that underlie sides 207, 209, respectively, of structural member 200. The flutes 235 define flute axes, such as flute axis 237, parallel to one another such that the mediums, such as mediums 234, 244, 254, in combination with the linerboards, such as linerboards 232, 242, 252, form a series of columns 262 parallel to the flute axes, such as flute axis 237, between side 37 and side 39 of core 30 that, for example, may support a weight applied to side 207 of structural member 200.

Figure 7A:
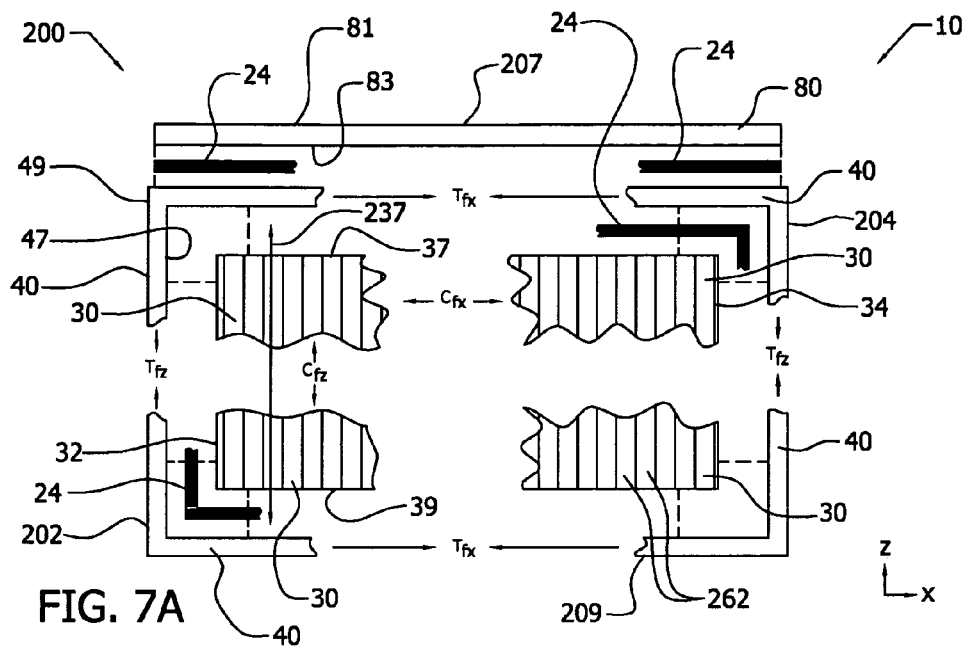
FIG. 7A illustrates by an exploded cut-away end view portions of the exemplary structural member of FIG. 6A.

FIG. 7A illustrates exemplary forces developed within structural member 200 as assembled using, for example, fabrication machine 10. As illustrated, wrapper 40 surrounds sides 32, 34, 37, 39 of core 30, and wrapper 40 is secured to core 30. Adhesive 24, as illustrated, is interposed between side 47 of wrapper 40 and sides 32, 34, 37, 39 of core 30 to secure wrapper 40 to core 30. Adhesive 24 may cover the entirety of sides 32, 34, 37, 39 of core 30 in the implementation as shown. In other implementations, adhesive 24 may cover selected portions of sides 32, 34, 37, 39 of core 30. For example, adhesive 24 may cover the entirety of side 37 of core 30 and adhesive 24 may cover the entirety of side 39 of core 30 and adhesive 24 may be omitted from sides 32, 34 in securing wrapper 40 to core 30.

Reinforcing wrapper 80 is secured to side 37 of core 30 with portions of wrapper 40 disposed between reinforcing wrapper 80 and core 30, as illustrated. As illustrated in FIG. 7A, adhesive 24 is interposed between side 83 of reinforcing wrapper 80 and the portions of side 49 of wrapper 40 that are secured to side 37 of core 30 to secure reinforcing wrapper 80 to wrapper 40 and thence to side 37 of core 30. Adhesive 24 may cover the entirety of side 83 of reinforcing wrapper 80 per the illustrated implementation. Side 81 of reinforcing wrapper 80 is faced externally to structural member 200, in this implementation.

Wrapper 40 is secured to core 30 with tension force $T_{fx}$ along the x-axis, as illustrated, so that corresponding force $C_{fx}$ is developed in the core with $T_{fx}=\frac{1}{2} C_{fx}$. Introduction of tension force $T_{fx}$ in wrapper 40 and thus corresponding tension force $C_{fx}$ pre-stresses structural member 200 in the x axial direction, which may strengthen structural member 200 against column buckling of columns 262.

As illustrated in FIG. 7A, wrapper 40 is secured to core 30 with tension force $T_{fz}$ along the z-axis, as illustrated, so that corresponding force $C_{fz}$ is developed in the core with $T_{fz}=\frac{1}{2} C_{fz}$. Introduction of tension force tension force $T_{fx}$ in wrapper 40 and thus corresponding tension force $C_{fx}$ pre-stresses structural member 200 in the direction along the z-axis.

Figure 7B:
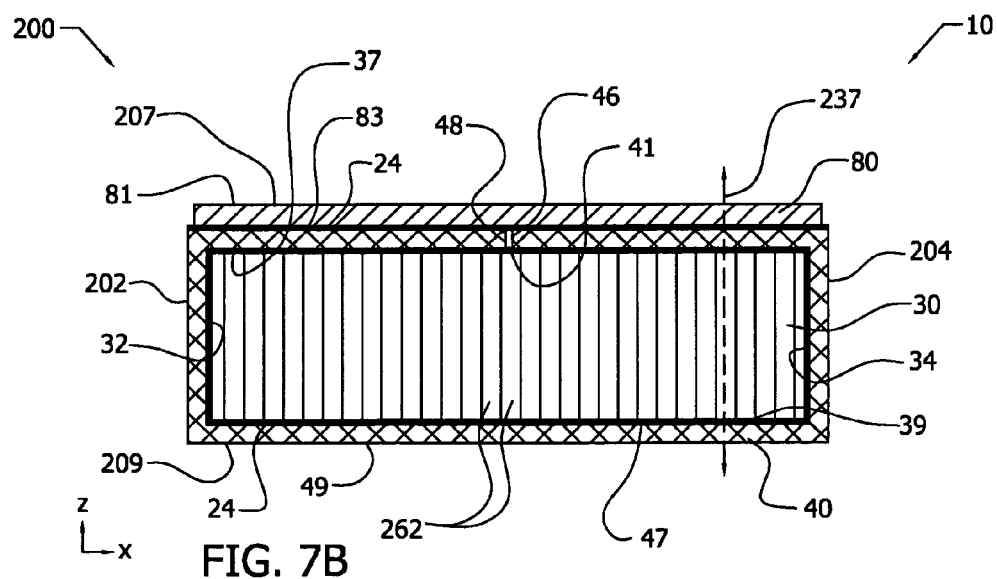
FIG. 7B illustrates by cut-away end view portions of the exemplary structural member of FIG. 6A.

FIG. 7B illustrates exemplary structural member 200. As illustrated, wrapper 40 surrounds sides 32, 34, 37, 39 of core 30, and wrapper 40 is secured to core 30. Reinforcing wrapper 80 is secured to side 37 of core 30 with portions of wrapper 40 disposed between reinforcing wrapper 80 and core 30, as illustrated. Reinforcing wrapper 80 overlies seam 41 in wrapper 40 along side 37 of core 30. Adhesive 24, as illustrated in FIG. 7B, is interposed between side 47 of wrapper 40 and sides 32, 34, 37, 39 of core 30 to secure wrapper 40 to core 30. Adhesive 24 may cover the entirety of sides 32, 34, 37, 39 of core 30, as illustrated in FIG. 7B. Adhesive 24 is interposed between side 83 of reinforcing wrapper 80 and the portions of side 49 of wrapper 40 that are secured to side 37 of core 30 to secure reinforcing wrapper 80 to wrapper 40 and thence to side 37 of core 30, as illustrated in FIG. 7B. Adhesive 24 may cover the entirety of side 83 of reinforcing wrapper 80.

Figure 8A:
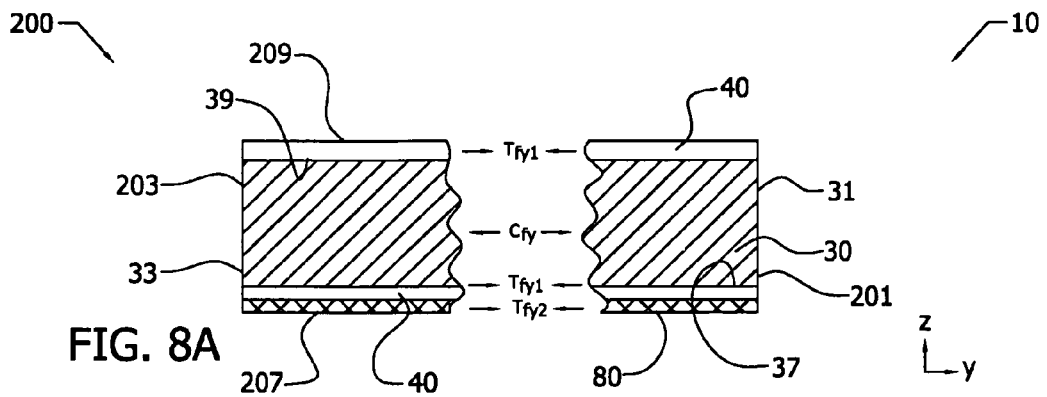
FIG. 8A illustrates by cut-away side view portions of the exemplary structural member of FIG. 6A.
Figure 8B:
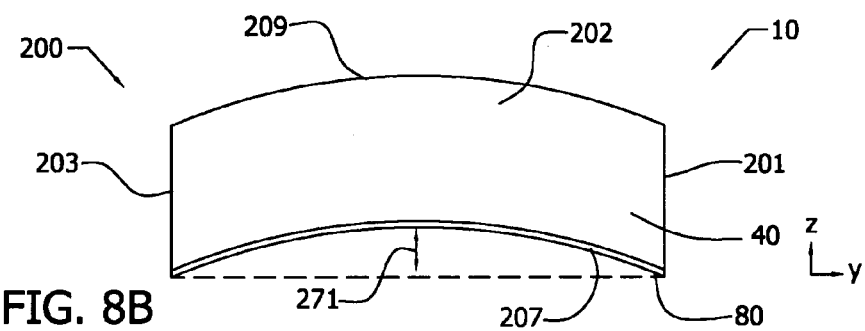
FIG. 8B illustrates by external side view portions of the exemplary structural member of FIG. 6A.

FIGS. 8A and 8B illustrate forces developed within structural member 200 along the longitudinal axis, which is oriented along the y-axis in these illustrations, by securement in tension of wrapper 40 and reinforcing wrapper 80 about core 30. As illustrated in FIG. 8A, wrapper 40 is tensioned to tension force $T_{fy1}$ in they axial direction, and the wrapper 40 is secured to core 30 at tension force $T_{fy1}$ including sides 37, 39 of core 30 as illustrated. The tension force $T_{fy1}$ in wrapper 40 may be selected, and brake 45, which cooperates with wrapper roll 42, may be set accordingly to produce the selected tension force $T_{fy1}$ in wrapper 40 as compression table 140, which engages wrapper 40, advances wrapper 40 from wrapper roll 42. $T_{fy1}$ may be at least two pounds per sq. in., in various implementations.

Reinforcing wrapper 80 is tensioned to tension force $T_{fy2}$ in they axial direction, and the reinforcing wrapper 80 is secured to side 37 of core 30 at tension force $T_{fy2}$ with portions of wrapper 40 secured between reinforcing wrapper 80 and side 37 of core 30. The tension force $T_{fy2}$ may be selected and brake 85 which cooperates with reinforcing wrapper roll 82 may be set accordingly such that the selected tension force $T_{fy2}$ is produced in reinforcing wrapper 80 as compression table 140, which engages reinforcing wrapper 80, advances reinforcing wrapper 80 from reinforcing wrapper roll 82.

Figure 8C:
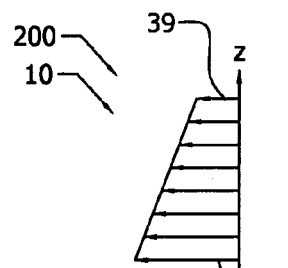
FIG. 8C illustrates by Cartesian plot an exemplary stress distribution within exemplary structural member of FIG. 6A.
Figure 8D:
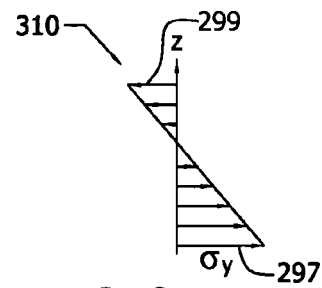
FIG. 8D illustrates by Cartesian plot an exemplary stress distribution within the exemplary simply supported structural member of FIG. 8F under point load F.
Figure 8E:
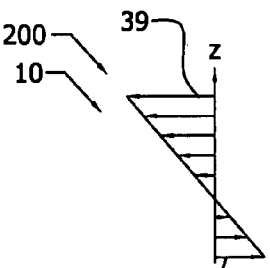
FIG. 8E illustrates by Cartesian plot an exemplary stress distribution resulting from the superposition of the exemplary stress distributions of FIG. 8C and FIG. 8D.
Figure 8F:
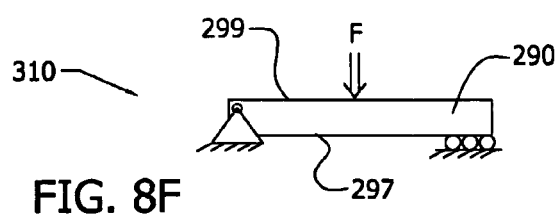
FIG. 8F illustrates by side view an exemplary simply supported structural member under point load F.

As illustrated in FIG. 8A, structural member 200 is tensioned to $T_{fy1}+T_{fy2}$ in the y axial direction proximate side 207 and structural member 200 is tensioned to $T_{fy1}$ in the y axial direction proximate side 209. Note position of sides 207, 209 and reinforcing wrapper 80 in FIGS. 8A-8E. The tensions and $T_{fy1}$ and $T_{fy2}$ produce corresponding compression force $C_{fy}$ within core 30 of structural member 200, as illustrated in FIG. 8A. Because $T_{fy1}+T_{fy2}>T_{fy1}$ structural member 200 is cambered such that side 209 is convex and side 207 is concave with camber 271, as illustrated in FIG. 8B. The corresponding exemplary stress distribution (left arrows indicate compression & right arrows indicate tension) in they axial direction $\sigma_y$ within core 30 structural member 200 is illustrated in FIG. 8C. As illustrated in FIG. 8C, core 30 is entirely in compression between sides 37 and 39. FIG. 8D illustrates the stress distribution within a simply supported beam having similar dimensions to core 30 and having force F applied thereto. Simply supported beam 290 is illustrated in FIG. 8F. Using the principle of superposition, force F applied to side 209 of structural member 200 results in the stress distribution illustrated in FIG. 8E which equals the stress distribution of FIG. 8C plus the stress distribution of FIG. 8D. The compressions along side 39 of FIG. 8C and side 299 of FIG. 8D are additive resulting in greater compression along side 39 in FIG. 8E greater than the compression along sides 39, 299 in FIGS. 8C, 8D, respectively. The compression along side 37 of FIG. 8C and the tension along side 297 of FIG. 8D when added cancel one another with the result that the tension along side. 37 indicated in FIG. 8E is less than the tension along side 297 in FIG. 8D. As the core material may carry greater stress in compression than in tension, the result may be a greater load capacity than a non-prestressed structural member such as beam 290. The camber 271 of structural member 200 may increase the load capacity of structural member 200 due to arch action.

FIG. 9 illustrates by top view features of fabrication machine 300. As illustrated in FIG. 9, fabrication machine includes tracks 316, 318, 320, 322, 324 set in parallel to one another to allow for simultaneous assembly of multiple structural members, such as structural members 392, 393, 394, 395, 396, from wrapper 340 and multiple cores, such as cores 330, 332, 333. Wrapper 340 is advanced along tracks 316, 318, 320, 322, 324 from wrapper roll 342 generally from machine end 302 to machine end 304, as indicated by the arrows in the Figure. Wrapper 340 is split into parallel strips (illustrated in phantom and only partly shown in the Figure), such as strips 346, 348, proximate machine end 302 with each strip disposed along a corresponding track, as illustrated. For example, strip 346 lies along track 316 and strip 318 lies along track 348. Cores, such as cores 330, 332, 333, may be placed on wrapper 340, and the cores in combination with wrapper 340 may be assembled into structural members, such as structural members 392, 393, 394, 395, 396, generally simultaneously with one another by folding the corresponding strips of the wrapper about the cores and securing the strips of the wrapper adhesively in tension to the cores as the cores are advanced along their respective tracks. The wrapper core combinations 331, 334 are within arm sets 350, 356, respectively, with arm sets 350, 356 folding portions of wrapper 340 about the corresponding cores.

Cores, such as core 330, in combination with the strip formed from the wrapper, such as strip 346, advance along track 316 to pass through arm set 350, thence through roller set 378, and thence through compression table 390 to emerge as a structural member, such as structural member 392. The arm sets, such as arm sets 350, 352, 354, 356, 358 generally enfold the strips of the wrapper about the cores passing along the respective tracks.

With the cores generally enfolded by the wrapper, the wrapper may be tensioned about the cores in the x axial direction and in the z axial direction by roller sets 370, 372, 374, 376, 378, and the tensions in the wrapper in the x axial direction and in the z axial direction (normal to the view presented in the illustration) may be selected.

Note that the strips, such as strips 346, 348, extend generally from wrapper roll 342 through compression table 390 to allow the strips to be tensioned in the y axial direction between the wrapper roll 342 and the machine end 304 of fabrication machine 300. Compression table 390 engages the strips of wrapper 340 to advance wrapper 340 from wrapper roll 342 under the selected tension. An adjustable brake (not shown) may be provided about wrapper roll 342 to allow selection of the tension in the wrapper in the y direction.

Although not illustrated in FIG. 9, a reinforcing wrapper, such as reinforcing wrapper 80, and associated mechanisms may be included in various implementations of fabrication machine 300, and reinforcing wrapper 80 may be split into strips with the strips being tensioned about at least portions of the core—wrapper combinations at a selected tension. The compression table, in such implementations, may engage the reinforcing wrapper to advance the reinforcing wrapper from the reinforcing wrapper roll at the selected tension.

Adhesive is applied to secure the wrapper to the core and to secure the reinforcing wrapper, if included, to the wrapper and thence to the core. Compression table 390 holds the wrapper and the reinforcing wrapper, if included, in tension about the core to allow adhesive to cure thereby securing the wrapper and the reinforcing wrapper about the core at the selected tensions in the x, y, z axial directions.

Arm sets 350, 352, 354, 356, 358 may be generally similar to arm set 110, roller sets 370, 372, 374, 376, 378 may be generally similar to roller set 140, and compression table 390 may be generally similar to compression table 180, in the implementation illustrated in FIG. 9. Various other implementations may include various numbers of tracks, such as tracks 316, 318, 320, 322, 324. The arm sets corresponding to the various tracks, such as arm sets 350, 352, 354, 356, 358, may be generally similar to one another, in some implementations, or the arm sets on roller sets 370, 372, 374, 376, 378 the various tracks may differ from one another, in other implementations. The roller sets corresponding to the various tracks may be generally similar to one another, in some implementations, or the roller sets on the various tracks may differ from one another, in other implementations.

Figure 10A:
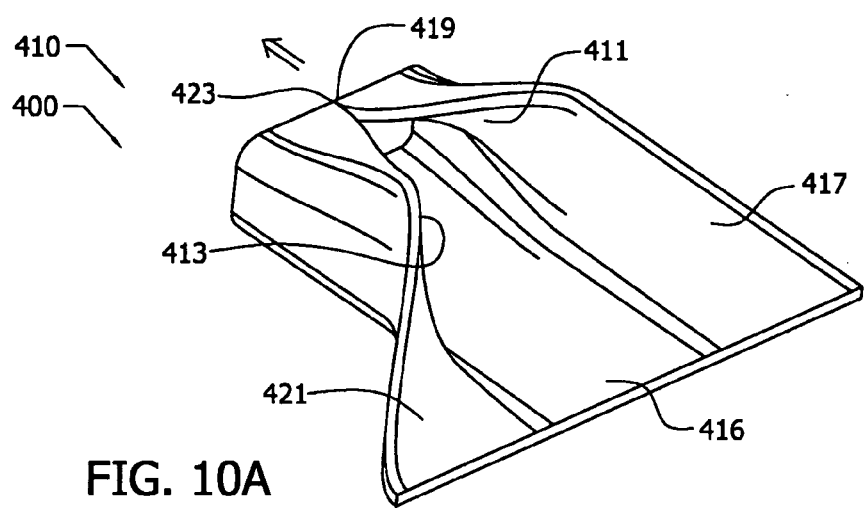
FIG. 10A illustrates by plan view portions of yet another exemplary fabrication machine.
Figure 10B:
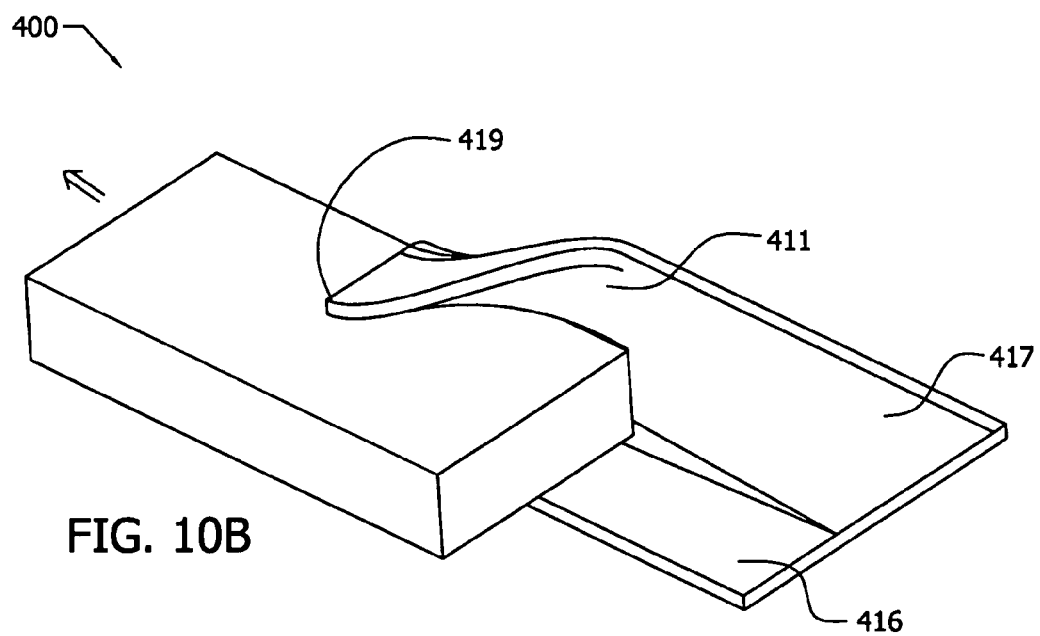
FIG. 10B illustrates by perspective view portions of the exemplary fabrication machine of FIG. 10A.

FIGS. 10A and 10B illustrate portions of fabrication machine 400 include arms 411, 413 of arm set 410 placed about opposite sides of track 416 to fold a wrapper, such as wrapper 40, about a core, such as core 30. As illustrated in FIG. 10A, as the core and wrapper move along track 416 in the direction indicated by the arrow, arms 411 and 413 of arm set 410 engage the wrapper to fold the wrapper about the core. In this implementation, arms 411, 413 are continuous curved structures that generally form an acute angle with respect to track 416 proximate ends 417, 412 (similar to arms 111, 113 in FIG. 2B) and curve to pass over the core at ends 419, 423 (similar to arms 123, 125 in FIG. 2E). FIG. 10B illustrates the curvature of arm 411 between end 417 and end 419.

Figure 11:
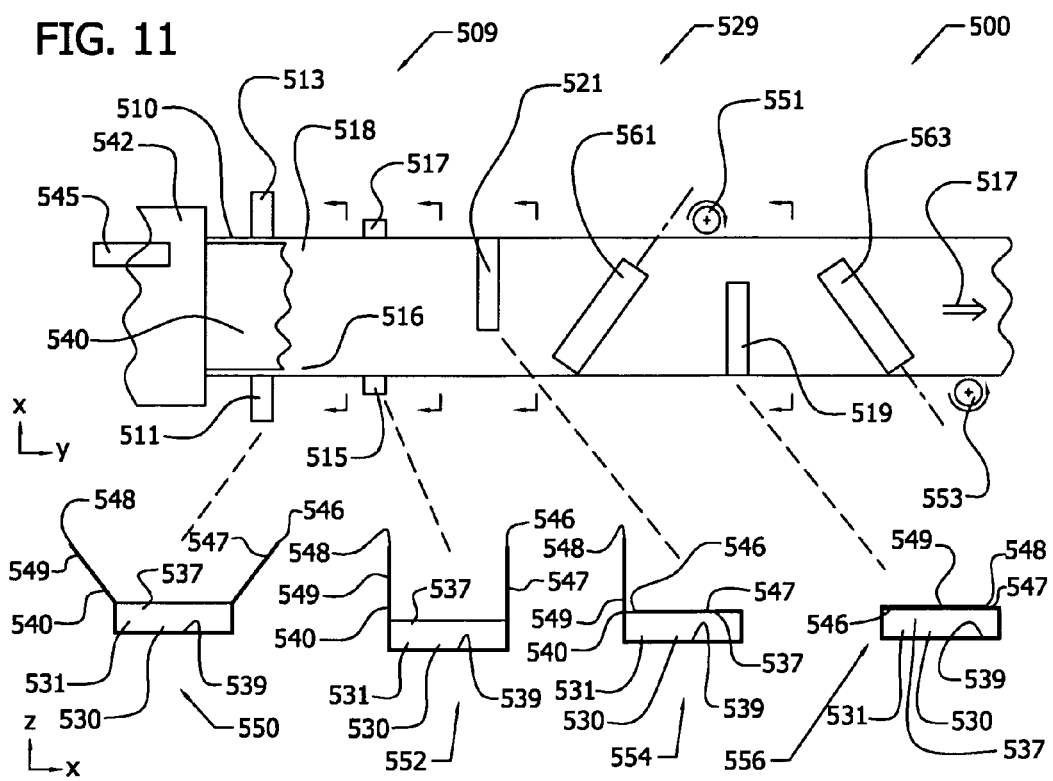
FIG. 11 illustrates by plan view portions of an exemplary fabrication machine including fabrication stages at various locations.

FIG. 11 illustrates portions of exemplary fabrication machine 500. This implementation eliminates the separate reinforcing wrapper, such as reinforcing wrapper 80 while achieving similar stress distributions to those of structural member 200 illustrated in FIGS. 8A, 8B using only wrapper 540. As illustrated in FIG. 11, wrapper roll 542 is positioned at machine end 510 of fabrication machine 500, and the flow of materials including wrapper 540 and core 530 is generally in the direction indicated by arrow 517. Core 530 is placed upon wrapper 540 proximate machine end 510. FIG. 11 illustrates the position of wrapper 540 about core 530 at fabrication stages 550, 552, 554, 556 as wrapper 540 is secured to core 530 in the detailed illustrations presented below track 516. The location of fabrication stages 550, 552, 554, 556 along track 516 is indicated in FIG. 11 by the dashed lines between the detailed illustrations of fabrication stages 550, 552, 554, 556 and track 516 of fabrication machine 500. Fabrication stages 550, 552, 554, 556 are illustrated by end view from the viewpoint indicated by the corresponding break lines in FIG. 11.

With core 530 placed upon wrapper 540 proximate machine end 510 of fabrication machine 500, wrapper 540 is pulled in the direction indicated by arrow 517. Arms 511, 513 position wrapper 540 generally as illustrated in FIG. 11 such that portions of wrapper 540 form flaps 547, 549 that extend beyond core 530 at fabrication stage 550. As wrapper 540 in combination with core 530 advances in the direction indicated by arrow 517 from engagement with arms 511, 513 to engagement with arms 515, 517, flaps 547, 549 are generally positioned in the vertical position by engagement with arms 515, 517 at fabrication stage 552.

Wrapper 540 engages arm 521 that folds flap 547 over side 537 of core 530 at fabrication stage 554 as wrapper 540 in combination with core 530 advances in the direction indicated by arrow 517 from engagement with arms 515, 517 to engagement with arm 521. Following folding of flap 547 over side 537 of core 530, roller 561 engages wrapper 540 to further enfold wrapper 540 over side 537 of core 530. Roller 561 may engage wrapper 540 to tension wrapper 540 about core 530. Note that flap 547 spans side 537 of core 530 when secured to core 530, as illustrated.

Following engagement with arm 521 and rollers 561, 551, the core wrapper combination engages arm 519 that folds flap 549 over side 537 of core 530 with flap 547 interposed between flap 549 and side 537 of core 530 at fabrication stage 556, as illustrated. Note that flap 549 spans side 537 of core 530, as illustrated. Roller 563 engages wrapper 540 to further enfold wrapper 540 over side 537 of core 530 following folding of flap 549 over side 537 of core 530 by arm 519. Roller 553 may engage wrapper 540 to tension wrapper 540 about core 530.

Arms 511, 513, 515, 517, 519, 521, which form arm set 509, may be generally formed similarly to arms 111, 113, 115, 117, 119, 121, 123, 125 of fabrication machine 10 (see FIGS. 2A to 2E) or similar to arms 411, 413 of fabrication machine 400 (see FIGS. 10A and 10B), or combinations thereof, in various implementations. More or fewer arms, such as arms 511, 513, 515, 517, 519, 521, may be provided, in various other implementations. Arms 511, 513, 515, 517, 519, 521 are generally fixed in the illustrated implementation, but arms, such as arms 511, 513, 515, 517, 519, 521, may be positionable to engage the wrapper, such as wrapper 540, and place the wrapper about the core, such as core 530, as the arms are positioned, in various other implementations.

Roller set 529 includes rollers 551, 561, 563, 553, in this implementation. Any number of rollers, such as rollers 551, 561, 553, 563, having various orientations may be provided, in various other implementations, and power may be provided to various combinations of the rollers. Adhesive may be applied to core 530, wrapper 540, including flaps 547, 549, as required to secure wrapper 540 including flaps 547, 549 to one another and to core 530.

Figure 12A:
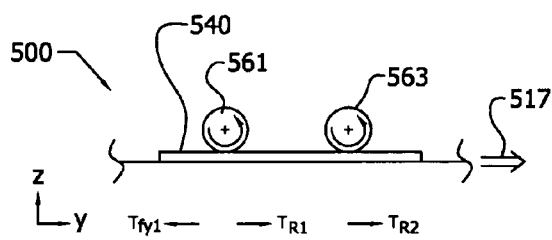
FIG. 12A illustrates by side view portions of the exemplary fabrication machine of FIG. 11.
Figure 12B:
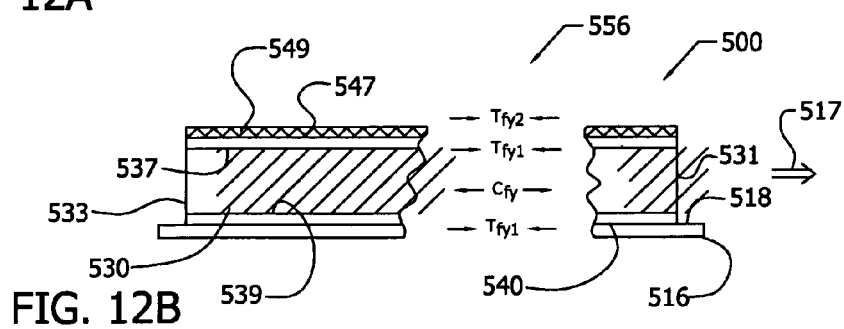
FIG. 12B illustrates by end view portions of an exemplary structural member in the exemplary fabrication machine of FIG. 11, the exemplary structural member being at an exemplary fabrication stage.

FIGS. 12A and 12B illustrate tension forces generated within the wrapper 540 as flaps 547, 549 are folded about core 530 by fabrication machine 500. Rollers 561, 563 of fabrication machine 500 are under powered rotation about their axes by motor(s) or other mechanisms (not shown) to engage wrapper 540 in order to pull upon wrapper 540 with tractive forces $T_{R1}$, $T_{R2}$, respectively, thereby pulling wrapper 540 from wrapper roll 542, as illustrated. Tension $T_{fy1}$ is developed in wrapper 540 between roller 561 and wrapper roll 540 (see FIG. 10) where $T_{fy1}=T_{R1}+T_{R2}$ under steady state conditions as wrapper 540 is pulled from wrapper roll 542. Accordingly, wrapper 540 including flap 547 is tensioned to tension $T_{fy1}$ as wrapper 540 including flap 547 is secured to core 530, in this implementation.

Tension force $T_{fy2}$, which is the tension force in wrapper 540 between roller 561 and roller 563 is then given by $T_{fy2}=T_{fy1}-T_{R1}$. Accordingly, flap 549 of wrapper 540 is tensioned to tension $T_{fy2}$ as flap 549 is secured to side 537 of core 530, in this implementation.

Tension $T_{fy1}$ and tension force $T_{fy2}$ are selectable so that fabrication machine 500 may emplace flap 547 over side 537 of core 530 at selected tension $T_{fy1}$, and fabrication machine 500 may emplace flap 549 over side 537 of core 530 at selected tension $T_{fy2}$. Tension $T_{fy1}$ may be adjusted by adjustment of the frictional force exerted upon wrapper roll 542 by adjustable brake 545 as wrapper 540 is withdrawn from wrapper roll 542, and the tractive forces $T_{R1}$, $T_{R2}$ exerted upon wrapper 540 by rollers 561, 563, respectively, may be adjusted. Accordingly, tension force $T_{fy2}$ in flap 549 may be adjusted by adjustment of various combinations of $T_{fy1}$ and $T_{R1}$.

FIG. 12B illustrates the forces developed in the core-wrapper assembly generally concurrent with and following fabrication stage 556 of fabrication machine 500. As illustrated, side 539 of core 530 is generally placed upon surface 518 of track 516 of fabrication machine 500, and sides 531, 533 are faced toward the flow of materials indicated by arrow 517 and toward machine end 510, respectively (see FIG. 11). Wrapper 540 at tension force $T_{fy1}$ is secured to core 530 including flap 547 which is secured to side 537 of core 530 at tension force $T_{fy1}$, as illustrated in FIG. 12B. Flap 549 is secured at tension force $T_{fy2}$ to flap 547, and, thence, to side 537 of core 530, in this implementation. Accordingly, side 537 of core 530 is generally compressed by force $T_{fy1}+T_{fy2}$ in the y-direction and side 539 of core 530 is compressed by force $T_{fy1}$ in the y-direction, thereby forming a prestressed member having differential stresses across the member, as illustrated in FIG. 12B.

In operation, a fabrication machine, such as fabrication machine 10, 300, 400, 500 may tension a wrapper, such as wrapper 40, 340, 540 in the y axial direction between a wrapper roll, such as wrapper roll 42, 342, 542 and the opposite machine end, such as machine end 14, 304. In various implementations, devices such as compression table 180, 390 located proximate the opposite machine end may engage the wrapper to advance the wrapper from the wrapper roll at the selected tension. In some implementations, rollers, such as rollers 561, 563 may engage the wrapper to advance the wrapper from the wrapper roll. A brake, such as brake 45, 85, 545, may cooperate with the wrapper roll to control the tension in the wrapper to the selected tension as the wrapper is advanced from the wrapper roll. The tension in the wrapper may be adjusted by adjustment of the braking force applied to the wrapper roll by the brake.

A core, such as core 30, 330, 332, 333, 530, may be emplaced upon the wrapper, and adhesive, such as adhesive 24, applied to secure the wrapper and the core to one another. The wrapper may be folded about the core, and, the wrapper may be tensioned in directions orthogonal to the tension between the wrapper roll and the opposite machine end. An arm set, such as arm set 110, 350, 352, 354, 356, 358, 410, 509, may engage the wrapper or a strip formed from the wrapper, such as strip 346, 348, to fold the wrapper or strip over the core. A roller set, such as roller set 140, 370, 372, 374, 376, 378, 529, may engage the wrapper to tension the wrapper about the core at selected tensions in the x axial direction, in the z axial direction, or in both the x axial direction and the z axial direction.

A compression table, such as compression table 180, 390, may secure the wrapper about the core at the selected tensions in the x, y, z axial directions to allow the adhesive to cure. When the adhesive has cured, the wrapper is affixed to the core by the cured adhesive at the selected tensions in the x, y, z axial directions. The combination of wrapper-core exits the compression table with the adhesive cured thereby forming a structural member, such as structural member 200, 392, 393, 394, 395, 396. Various cutters may then be provided, in various implementations, to cut the wrapper after the adhesive has cured to release the structural member, and various folding mechanisms may also be provided in conjunction with the cutters to fold the wrapper over portions of the structural member.

In various implementations, the structural member may include a reinforcing wrapper, such as reinforcing wrapper 80. The reinforcing wrapper may be tensioned between a reinforcing wrapper roll, such as reinforcing wrapper roll 82, and the opposite machine end. Devices such as compression table 180, 390 located proximate the opposite machine end may engage the reinforcing wrapper to advance the reinforcing wrapper from the reinforcing wrapper roll at the selected reinforcing wrapper tension. A brake, such as brake 85, may cooperate with the wrapper roll to control the reinforcing wrapper tension in the reinforcing wrapper to the selected reinforcing wrapper tension as the reinforcing wrapper is advanced from the reinforcing wrapper roll.

Adhesive may be applied to secure the reinforcing wrapper at the reinforcing wrapper tension to portions of the core with portions of the wrapper interposed between the reinforcing wrapper and the core. The compression table may hold the reinforcing wrapper in engagement with the wrapper and thence the core at the selected reinforcing wrapper tension until the adhesive cures. The adhesive has cured, in various implementations, proximate the exit of the core-wrapper—reinforcing wrapper from the compression table so that the cured adhesive affixes the reinforcing wrapper to the wrapper and thence to the core at the selected reinforcing wrapper tension.

Figure 13:
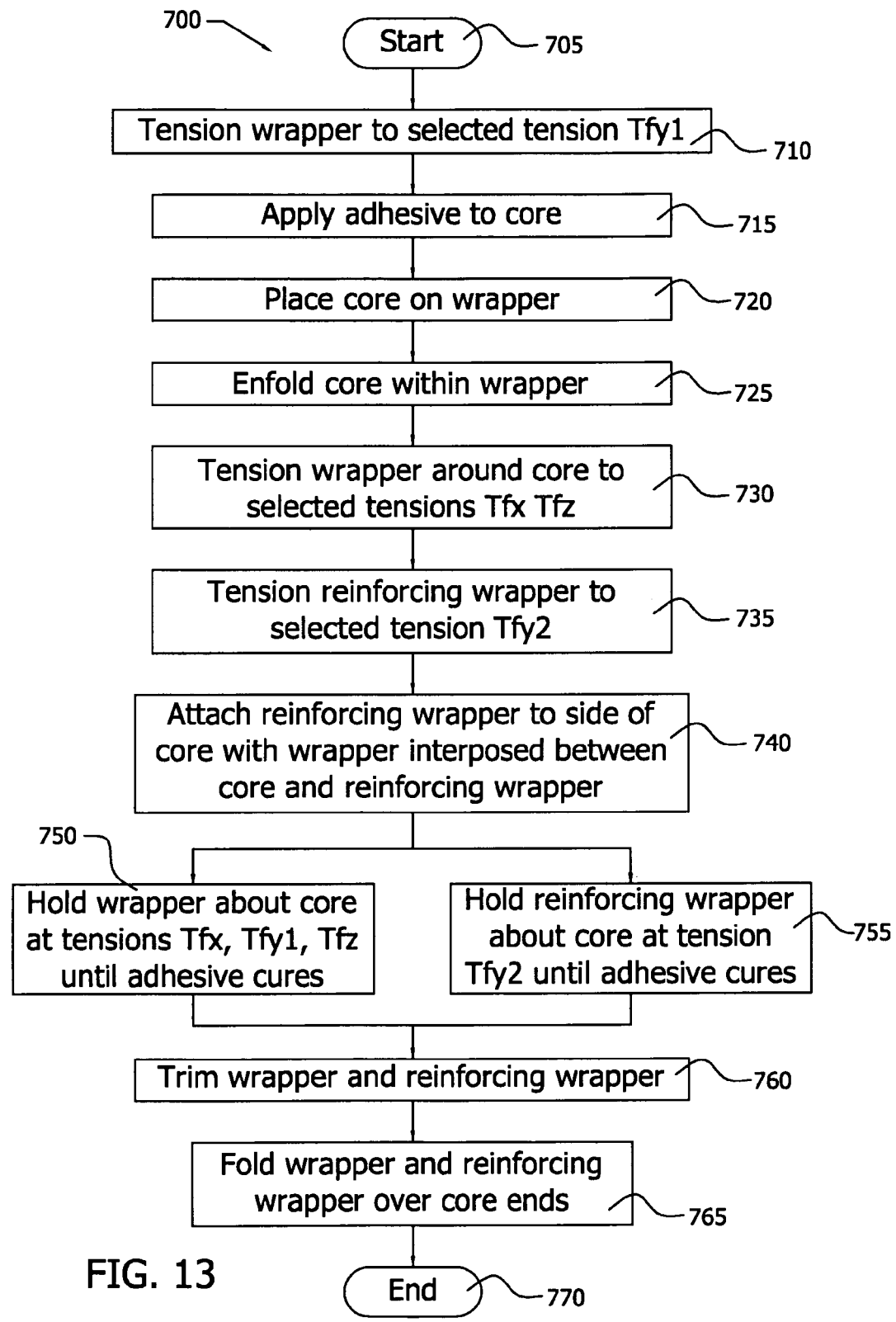
FIG. 13 illustrates by process flow chart an exemplary method of use of a fabrication machine; and, FIG. 14 illustrates by process flow chart another exemplary method of use of a fabrication machine.

FIG. 13 illustrates by process flow chart exemplary method 700 of forming the structural member using a fabrication machine such as fabrication machine 10. Process 700 is entered at step 705. At step 710, the wrapper is tensioned to the selected tension in the y axial direction $T_{fy1}$. Adhesive is applied to secure the wrapper to the core at step 715. At step 720, the core is placed upon the wrapper. The wrapper is then folded about the core such that the wrapper enfolds the core at step 725. The wrapper is tensioned around the core to selected tensions $T_{fx}$, $T_{fz}$ at step 730. The reinforcing wrapper is tensioned to selected tension $T_{fy2}$ at step 735, and the reinforcing wrapper is attached to the wrapper and thence to the core using adhesive, at step 740. The wrapper is held about the core at the selected tension $T_{fx}$, $T_{fy1}$, $T_{fz}$ until the adhesive cures at step 750 to secure the wrapper to the core at the selected tension $T_{fx}$, $T_{fy1}$, $T_{fz}$. The reinforcing wrapper is held in tension about the core until the adhesive cures to secure the reinforcing wrapper to the core at selected tension $T_{fy2}$ at step 755. Steps 750 and steps 755 occur concurrently, as indicated in FIG. 13. With the adhesive cured, method 700 proceeds from steps 750 and 755 to step 760. At step 765, the wrapper and the reinforcing wrapper are trimmed about the core, and the wrapper and the reinforcing wrapper are folded over core ends, such as sides 31, 33 of core 30. The method terminates at step 770 with the production of the structural member having the wrapper and the reinforcing wrapper secured about the core at the selected tensions $T_{fx}$, $T_{fy1}$, $T_{fz}$, and $T_{fy2}$, respectively.

Figure 14:
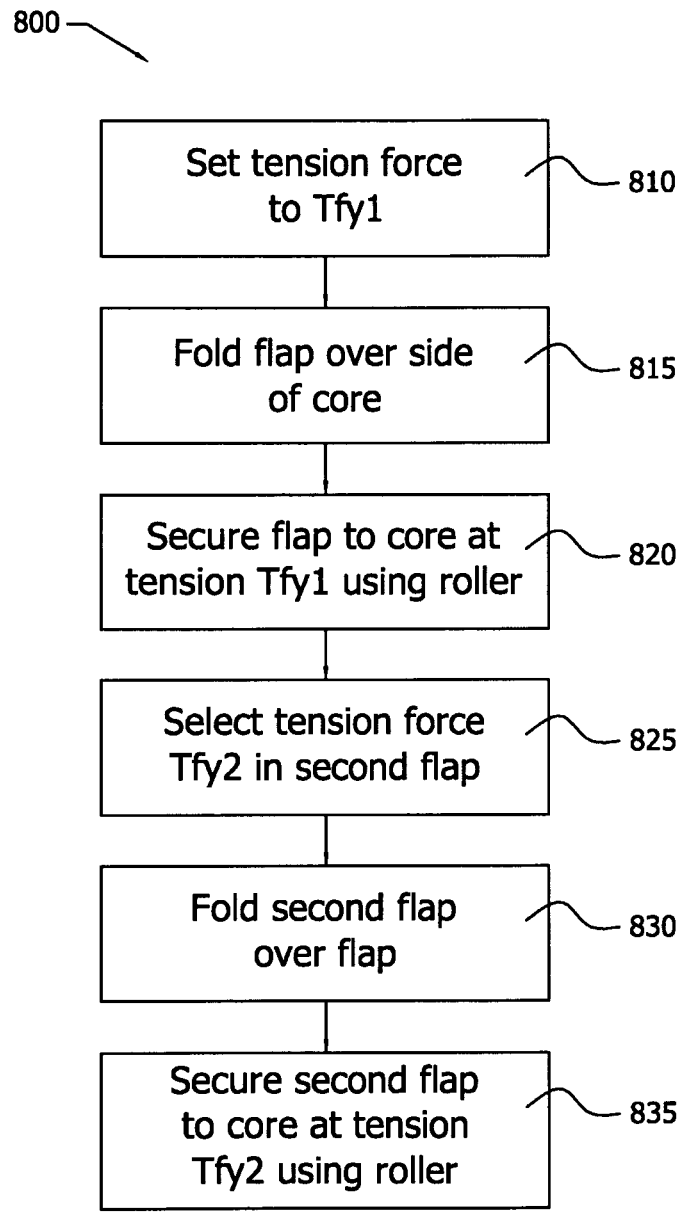

FIG. 14 illustrates by process flow chart exemplary method 800 for forming a structural member using a fabrication machine such as fabrication machine 500. As illustrated in FIG. 14, method 800 begins at step 810 with setting the tension force in the wrapper to $T_{fy1}$. At step 815, arms, such as arms 511, 513, 515, 517, 521 fold a flap, such as flap 547, of the wrapper over a side, such as side 537, of the core. At step 820, rollers, such as rollers 551, 561, engage the wrapper to secure the wrapper adhesively under tension to the core. At step 825, a second tension force $T_{fy2}$ is selected with a second flap, such as flap 549, being tensioned to tension force $T_{fy2}$. The second flap is secured to the core at tension $T_{fy2}$ using rollers, such as rollers, 553, 563, at step 835. Accordingly, the wrapper is secured to at least portions of the core at two separate tensions, $T_{fy1}$ and $T_{fy2}$, in this implementation.

The fabrication machine may include a brake adapted to mechanically cooperate with a wrapper to impart a longitudinal tension to the wrapper by controlling the force required to advance the wrapper, the wrapper comprised of a cellulose-based material. The brake is adjustable to allow selection of the longitudinal tension, in various aspects. The fabrication machine may include a wrapper roll in mechanical cooperation with the brake, the wrapper being drawn from the wrapper roll as the wrapper is advanced. The fabrication machine may include a conveyance adapted to advance the wrapper at the longitudinal tension in combination with a core. The fabrication machine may include an adhesive placed between the wrapper and the core to bond the wrapper in longitudinal tension to the core. The fabrication machine may include a second brake adapted to mechanically cooperate with a reinforcing wrapper to impart a longitudinal tension to the reinforcing wrapper by controlling the force required to advance the reinforcing wrapper, the reinforcing wrapper comprised of a cellulose based material, the reinforcing wrapper adapted for securement in longitudinal tension over portions of the wrapper bonded to the core to form a pre-stressed structural member. The fabrication machine may include a roller adapted to engage a wrapper disposed about a core to tension the wrapper to a wrapper tension and to correspondingly compress the core to a core compression. The fabrication machine may include an adhesive placed between the wrapper and the core, the adhesive bonds the wrapper to the core to maintain the core compression and the wrapper tension. The fabrication machine may include a conveyance adapted to hold the wrapper at the longitudinal tension about the core as the wrapper is bonded to the core. The fabrication machine may include an orthogonal roller adapted to engage the wrapper disposed about the core to tension the wrapper at an orthogonal wrapper tension and to compress correspondingly the core to an orthogonal core compression, the orthogonal wrapper tension being generally orthogonal to the wrapper tension and the orthogonal core compression being generally orthogonal to the core compression. The fabrication machine may include an adhesive placed between the wrapper and the core, the adhesive bonds the wrapper to the core to maintain the orthogonal core compression and the orthogonal wrapper tension. The fabrication machine may include one or more arms adapted to deploy the wrapper into one or more stages of enfoldment about the core prior to engagement of the roller with the wrapper. The fabrication machine may include a brake in mechanical cooperation with the wrapper to impart a selected longitudinal tension to the wrapper by controlling the force required to advance the wrapper, and an adhesive placed between the wrapper and the core to bond the wrapper to the core with the wrapper at the longitudinal tension. The fabrication machine may include a brake in mechanical cooperation with a wrapper roll to impart a selected longitudinal tension to a wrapper by controlling the force required to draw the wrapper from the wrapper roll, and a conveyor adapted to advance the wrapper at the selected longitudinal tension in combination with a core, the wrapper in communication with the wrapper roll. In various aspects, the conveyor is configured to hold the wrapper in peripheral tension about the core as the wrapper is bonded in tension to the core. The fabrication machine may include at least one arm adapted to deploy the wrapper in one or more stages of enfoldment about the core as the wrapper is advanced. The fabrication machine may include a roller, with the wrapper at least partly enfolded about the core the roller is adapted to engage the wrapper to tension the wrapper to a wrapper tension and to correspondingly compress the core to a core compression. The fabrication machine may include an orthogonal roller, with the wrapper at least partly enfolded about the core the orthogonal roller is adapted to engage the wrapper to tension the wrapper to an orthogonal wrapper tension and to compress correspondingly the core to an orthogonal core compression, the orthogonal wrapper tension being generally orthogonal to the wrapper tension and the orthogonal core compression being generally orthogonal to the core compression. The fabrication machine may include an adhesive placed between the wrapper and the core to bond the wrapper to the core, the wrapper being in tension when so bonded to the core. The fabrication machine may include a second brake adapted to mechanically cooperate with a reinforcing wrapper to impart a longitudinal tension to the reinforcing wrapper by controlling the force required to advance the reinforcing wrapper, the reinforcing wrapper comprised of a cellulose based material, the reinforcing wrapper adapted for securement in longitudinal tension over portions of the wrapper bonded to the core to form a pre-stressed structural member. In various aspects, the longitudinal tension of the reinforcing wrapper is selectable by adjustment of the second brake.

The tension in the wrapper may be varied by resistance at any number of rollers in the fabrication machine as well as by a brake on the wrapper roll. This tension will be variable by changes to braking and/or variable configurations of rollers or other elements contacting the wrapper and will be intermittently or continuously measured mechanically and/or electronically at one or more locations along the length of the wrapper. The pressure exerted by the rollers may be variable and may be measured using various sensors. Their angle of the rollers, the position of the rollers, or both the angle and position of the rollers may be varied, for example in order to introduce a variety of tensions into the wrapper.

The foregoing discussion along with the Figures discloses and describes various exemplary implementations. These implementations are not meant to limit the scope of coverage, but, instead, to assist in understanding the context of the language used in this specification and in the claims. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A method, comprising the steps of:
advancing a wrapper with a core emplaced thereupon through a fabrication machine in a direction of material flow, the wrapper being formed of a flexible sheet of cellulose based material, the core being formed of laminated fiberboard sheets;
engaging the wrapper and the core with the fabrication machine as the core and the wrapper advance in the direction of material flow between side rollers, the side rollers engaging the wrapper and imparting a peripheral tension to the wrapper around the core,
the peripheral tensioning of the wrapper about the core is in directions orthogonal to the direction of material flow; and
securing the wrapper in tension to the core with adhesive interposed between the core and the wrapper.

2. The method of claim 1, further comprising the steps of:
tensioning the wrapper to a selected longitudinal tension; and
securing the wrapper while at the selected longitudinal tension to the core.

3. The method of claim 1, further comprising the step of:
folding the wrapper in part about the core by engaging the wrapper with an arm while advancing the wrapper with the core emplaced thereupon past the arm.

4. The method of claim 1, further comprising the step of:
using a brake in mechanical cooperation with the wrapper to impart a selected longitudinal tension in the direction of material flow to the wrapper by controlling the force required by a mechanism to advance the wrapper along the track.

5. The method of claim 4, further comprising the steps of:
pulling from a reinforcing wrapper roll a reinforcing wrapper wound upon the reinforcing wrapper roll, the reinforcing wrapper comprising a flexible sheet of cellulose based material;
setting a second brake mechanically adjustably cooperating with the reinforcing wrapper thereby tensioning the reinforcing wrapper to a selected longitudinal tension by controlling the force required to advance the reinforcing wrapper; and
securing adhesively the reinforcing wrapper in longitudinal tension to the core thereby fabricating said structural member.

6. The method of claim 1, further comprising:
using a compression table for holding the wrapper in tension about the core as adhesive interposed between the wrapper and the core cures while performing the step of securing the wrapper in tension to the core.

7. The method of claim 1, further comprising the side roller angle of at least a portion of the side rollers being within the range of from about 95° to about 175° relative to the direction of material flow to impart the peripheral tension to the wrapper around the core.

8. A fabrication machine, comprising:
a mechanism engageable with a wrapper to pull the wrapper along a track of said fabrication machine in a direction of material flow, the wrapper comprising a flexible sheet of cellulose based material;
side rollers, the wrapper with a core emplaced upon the wrapper are positioned between the side rollers, the core comprising laminated fiberboard sheets, the side rollers secured at a side roller angle relative to the direction of material flow to engage the wrapper and impart a peripheral tension to the wrapper around the core as the wrapper and the core move in the direction of material flow along the track; and
top rollers, the wrapper and the core positioned between the top rollers and the track, the top rollers secured at a top roller angle relative to the direction of material flow to engage the wrapper and impart a peripheral tension to the wrapper around the core as the wrapper and core move in the direction of material flow along the track, the peripheral tension imparted by the side rollers to the wrapper and imparted by the top rollers to the wrapper is at least in directions orthogonal to the direction of material flow.

9. The apparatus of claim 8, further comprising:
a brake in mechanical cooperation with the wrapper to impart a selected longitudinal tension in the direction of material flow to the wrapper by controlling the force required by the mechanism to pull the wrapper.

10. The apparatus of claim 9, wherein the longitudinal tension is selected as at least about 1.0 psi.

11. The apparatus of claim 9, wherein the longitudinal tension is selected as within a range of from about 2.0 psi to about 8.0 psi.

12. The apparatus of claim 9, further comprising:
a wrapper roll comprising the wrapper coiled about itself, the wrapper roll cooperates mechanically with the brake, the brake controlling the force required by the mechanism to pull the wrapper from the wrapper roll.

13. The apparatus of claim 8, the top rollers being in alternating placement with respect to the side rollers.

14. The apparatus of claim 8, the side roller angle of at least a portion of the side rollers being within the range of from about 95° to about 175°.

15. The apparatus of claim 8, the top roller angle of at least a portion of the top rollers being within the range of from about 5° to about 85°.

16. The apparatus of claim 1, the side roller angle of at least a portion of the side rollers being about 120°.

17. The apparatus of claim 8, the top roller angle of at least a portion of the top rollers being about 30°.

18. The apparatus of claim 8, further comprising:
a core placement mechanism to place the core upon the wrapper.

19. The apparatus of claim 8, further comprising:
an arm positioned between the wrapper roll and the mechanism to fold the wrapper about the core as the wrapper with core emplaced thereupon advances past the arm.

20. The apparatus of claim 19, further comprising:
a number of said arms positioned to fold progressively the wrapper about the core.

21. The apparatus of claim 8, further comprising:
a compression table that forms at least a portion of the mechanism, the compression table adapted to hold the wrapper in tension about the core as adhesive interposed between the wrapper and the core cures thereby forming a structural member comprising the wrapper secured in tension to the core with the core in corresponding compression.

22. The apparatus of claim 8, further comprising:
the mechanism engageable with a reinforcing wrapper comprised of a cellulose based material to secure the reinforcing wrapper at a second longitudinal tension to portions of the core with the wrapper interposed between the reinforcing wrapper and the core.

23. The apparatus of claim 22, further comprising:
a second brake in mechanical cooperation with the reinforcing wrapper to impart the second longitudinal tension to the reinforcing wrapper.

24. The apparatus of claim 8, further comprising:
adhesive disposed about the wrapper to secure the wrapper in tension to the core.

* * * * *